United States Patent
Kim et al.

(10) Patent No.: US 10,237,879 B2
(45) Date of Patent: Mar. 19, 2019

(54) METHOD FOR CHANNEL STATE REPORT IN WIRELESS COMMUNICATION SYSTEM AND APPARATUS THEREFOR

(71) Applicant: LG ELECTRONICS INC., Seoul (KR)

(72) Inventors: Eunsun Kim, Seoul (KR); Hanbyul Seo, Seoul (KR); Byounghoon Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/896,595

(22) PCT Filed: Jul. 2, 2014

(86) PCT No.: PCT/KR2014/005895
§ 371 (c)(1),
(2) Date: Dec. 7, 2015

(87) PCT Pub. No.: WO2015/005609
PCT Pub. Date: Jan. 15, 2015

(65) Prior Publication Data
US 2016/0135194 A1    May 12, 2016

Related U.S. Application Data

(60) Provisional application No. 61/843,912, filed on Jul. 9, 2013.

(51) Int. Cl.
*H04W 72/08* (2009.01)
*H04L 5/00* (2006.01)
(Continued)

(52) U.S. Cl.
CPC .......... *H04W 72/082* (2013.01); *H04B 7/022* (2013.01); *H04B 7/0626* (2013.01);
(Continued)

(58) Field of Classification Search
CPC .................................................. H04W 72/082
See application file for complete search history.

(56) References Cited

U.S. PATENT DOCUMENTS

2011/0255483 A1* 10/2011 Xu ....................... H04L 25/0232
  370/329
2012/0034926 A1    2/2012 Damnjanovic et al.
(Continued)

FOREIGN PATENT DOCUMENTS

CN    102771069    11/2012
CN    102859920    1/2013
(Continued)

OTHER PUBLICATIONS

PCT International Application No. PCT/KR2014/005895, Written Opinion of the International Searching Authority dated Oct. 28, 2014, 9 pages.
(Continued)

*Primary Examiner* — John D Blanton
(74) *Attorney, Agent, or Firm* — Lee Hong Degerman Kang Waimey

(57) ABSTRACT

A method for reporting channel state information of a user equipment (UE) having interference cancellation capabilities in a wireless communication system includes receiving, from a serving base station, a channel state report configuration indicating a report of a channel state to which interference cancellation is applied, or a report of a channel state to which interference cancellation is not applied, calculating a report value for a channel state according to the channel state report configuration, and transmitting the report value for the channel state to the serving base station. The channel state report configuration may be configured per subframe subset.

9 Claims, 7 Drawing Sheets

(51) Int. Cl.
*H04B 7/06* (2006.01)
*H04L 1/00* (2006.01)
*H04B 7/022* (2017.01)
*H04J 11/00* (2006.01)

(52) U.S. Cl.
CPC .......... *H04L 1/0003* (2013.01); *H04L 1/0009* (2013.01); *H04L 1/0026* (2013.01); *H04L 1/0038* (2013.01); *H04L 5/0048* (2013.01); *H04L 5/0057* (2013.01); *H04L 5/0082* (2013.01); *H04J 11/0023* (2013.01); *H04L 5/001* (2013.01); *H04L 5/005* (2013.01); *H04L 5/006* (2013.01); *H04L 5/0023* (2013.01); *H04L 5/0035* (2013.01)

(56) References Cited

U.S. PATENT DOCUMENTS

| | | | |
|---|---|---|---|
| 2012/0099544 | A1 | 4/2012 | Pajukoski et al. |
| 2012/0190391 | A1 | 7/2012 | Yoo et al. |
| 2013/0039349 | A1 | 2/2013 | Ebrahimi Tazeh Mahalleh et al. |
| 2013/0114435 | A1* | 5/2013 | Wang .................... H04W 48/16 370/252 |
| 2013/0136079 | A1 | 5/2013 | Wang et al. |
| 2013/0258874 | A1* | 10/2013 | Khoshnevis .......... H04L 5/0057 370/252 |
| 2013/0260763 | A1* | 10/2013 | Bhattad ............. H04W 36/0088 455/436 |
| 2014/0348009 | A1* | 11/2014 | Li ......................... H04W 24/10 370/252 |
| 2016/0044566 | A1* | 2/2016 | Nammi ................ H04B 1/1027 370/331 |
| 2017/0238323 | A1* | 8/2017 | Marinier ............... H04W 72/06 |

FOREIGN PATENT DOCUMENTS

| | | |
|---|---|---|
| JP | 2014524718 | 9/2014 |
| WO | 2011103476 | 8/2011 |
| WO | 2012096299 | 7/2012 |
| WO | 2013029000 | 2/2013 |
| WO | 2013068282 | 5/2013 |
| WO | 2013/089344 | 6/2013 |

OTHER PUBLICATIONS

European Patent Office Application Serial No. 14823599.7, Search Report dated Jan. 20, 2017, 8 pages.
The State Intellectual Property Office of the People's Republic of China Application Serial No. 201480038912.6, Office Action dated Apr. 2, 2018, 8 pages.

* cited by examiner

METHOD FOR CHANNEL STATE REPORT IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/005895, filed on Jul. 2, 2014, which claims the benefit of U.S. Provisional Application No. 61/843,912, filed on Jul. 9, 2013, the contents of which are all hereby incorporated by reference herein in their entirety.

TECHNICAL FIELD

The present invention relates to a wireless communication system and, more particularly, to a method for channel state report, and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for efficiently reporting channel state information in a wireless communication system.

Another object of the present invention devised to solve the problem lies in a method for utilizing interference cancellation capabilities of a user equipment (UE) upon reporting channel state information.

The technical problems solved by the present invention are not limited to the above technical problems and other technical problems which are not described herein will become apparent to those skilled in the art from the following description.

Technical Solution

The object of the present invention can be achieved by providing a method for reporting channel state information of a user equipment (UE) including interference cancellation capabilities in a wireless communication system including receiving, from a serving base station, interference cancellation information, calculating a channel state to which interference cancellation is applied according to the received interference cancellation information, and transmitting the calculated channel state to the serving base station.

Additionally or alternatively, the method may further include, receiving, from the serving base station, a channel state report configuration indicating a report of a channel state to which interference cancellation is applied (hereinafter, "first report"), or a report of a channel state to which interference cancellation is not applied (hereinafter, "second report").

Additionally or alternatively, the channel state report configuration may be configured per subframe subset.

Additionally or alternatively, the method may further include, if the channel state report configuration indicates both of the first report and the second report, receiving a resource configuration for each of the first report and the second report.

Additionally or alternatively, the method may further include, if interference measurement for calculating the channel state is based on a cell-specific reference signal (CRS) and resources for transmitting CRS of the serving base station overlap resources for transmitting CRS of a specific neighbor base station corresponding to an interference source, determining whether interference exist in resources other than the overlapped resources in a subframe using received power of the CRS of the specific base station.

Additionally or alternatively, the method may further include, if interference measurement for calculating the channel state is based on channel state information-interference measurement (CSI-IM), receiving, from the serving base station, information as to whether a specific reference signal (RS) sequence based data channel is transmitted in specific CSI-IM resources.

Additionally or alternatively, the information as to whether the specific reference signal (RS) sequence-based data channel is transmitted in the specific CSI-IM resources may be provided per subframe subset.

Additionally or alternatively, the method may further include receiving, from the serving base station, a plurality of channel state measurement resource configurations for channel state information measurement and report for the serving base station and at least one neighbor base station.

Additionally or alternatively, the method may further include receiving information as to which of the plurality of channel state measurement resource configurations is for the serving base station.

Additionally or alternatively, the method may further include receiving, from the serving base station, information on purposes of the plurality of channels state measurement resource configurations.

Additionally or alternatively, modulation and coding scheme (MCS) level-restriction information to be used for serving UEs may be exchanged between the serving base station and a neighbor base station, for interference cancellation, and the channel state report configuration may depend on the MCS level restriction information.

In another aspect of the present invention, provided herein is a method for reporting channel state information for a user equipment (UE) having interference cancellation capabilities in a wireless communication system including transmitting, to the UE, interference cancellation information, receiving, from the UE, a report for a channel state to which interference cancellation is applied according to the interference cancellation information.

In a further aspect of the present invention, provided herein is a user equipment (UE) having interference cancellation capabilities and configured to report channel state information in a wireless communication system including a radio frequency (RF) unit and a processor configured to control the RF unit, wherein the processor is configured to receive, from a serving base station, interference cancellation information, to calculate a channel state according to the received interference cancellation information, and to transmit the calculated channel state to the serving base station.

The above description corresponds to part of embodiments of the present invention and various embodiments reflecting technical characteristics of the present invention are derived and understood by those skilled in the art on the basis of the following detailed description of the present invention.

Advantageous Effects

According to one embodiment of the present invention, it is possible to efficiently report channel state information in a wireless communication system.

According to one embodiment of the present invention, since interference cancellation capabilities of a user equipment (UE) may be utilized upon reporting a channel state, it is possible to more efficiently schedule resources of the UE.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
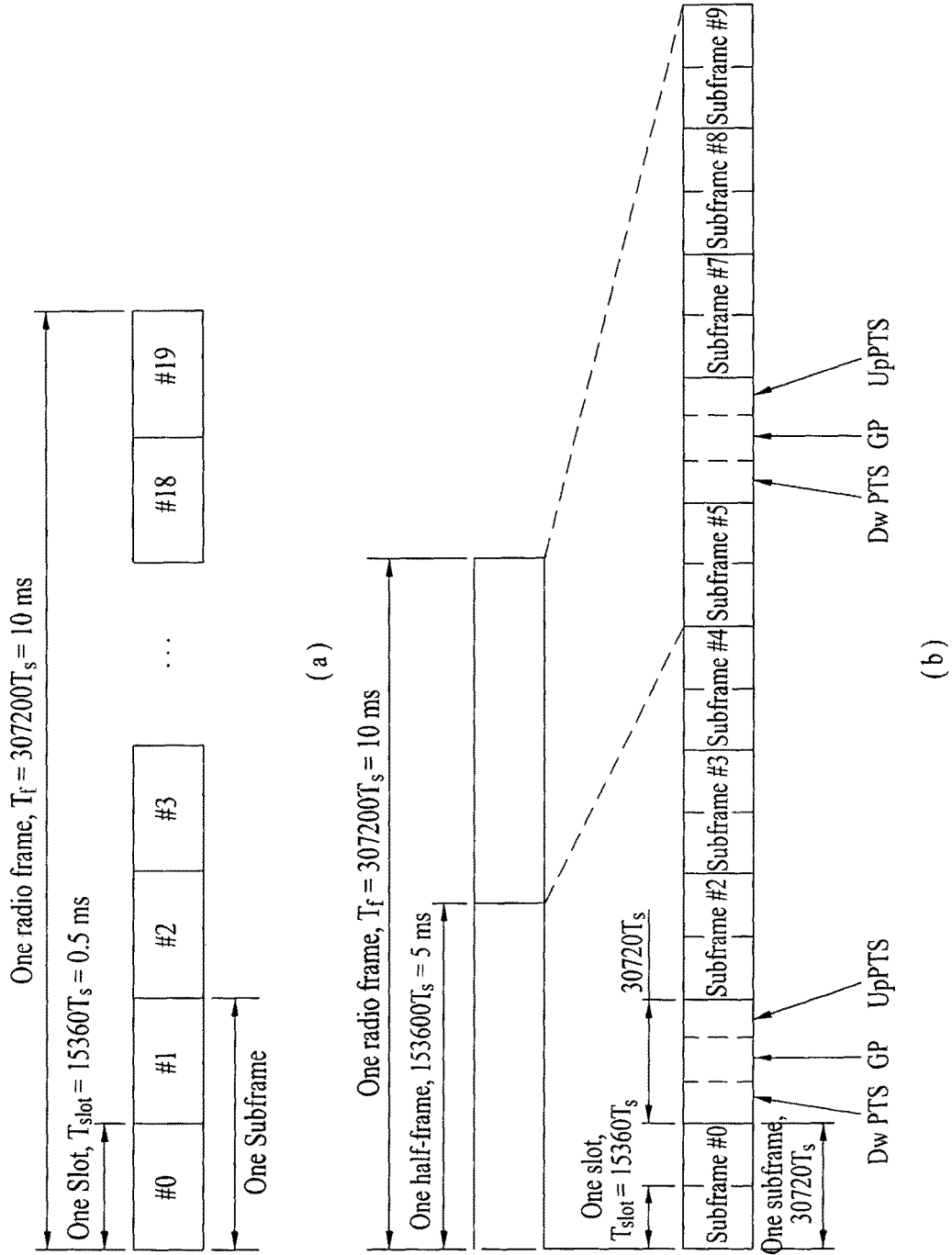
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDS CH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | \multicolumn{10}{c}{Subframe number} |||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | \multicolumn{3}{c}{Normal cyclic prefix in downlink} ||| \multicolumn{3}{c}{Extended cyclic prefix in downlink} |||
|---|---|---|---|---|---|---|
| | | \multicolumn{2}{c}{UpPTS} || | \multicolumn{2}{c}{UpPTS} ||
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

Figure 2:
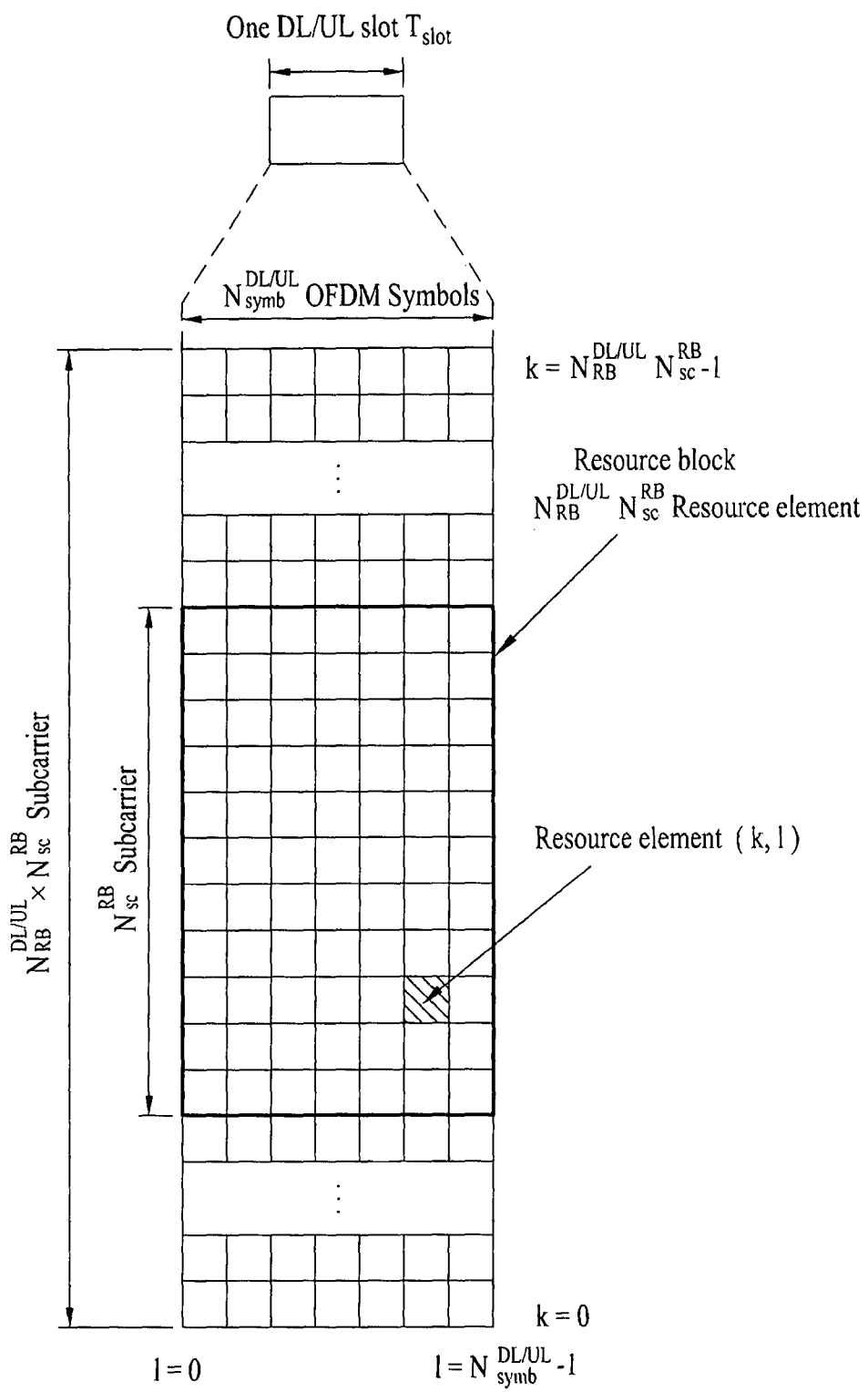
FIG. 2 is a diagram showing an example of a downlink/uplink (DL/UL) slot structure in a wireless communication system.

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL\setminus UL} * N_{sc}^{RB}$ subcarriers and $N_{symb}^{DL\setminus UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL|UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL|UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL|UL}*N_{sc}^{RB}$ REs. Each RE in a resource grid can be uniquely defined by an index pair (k, 1) in a slot. Here, k is an index in the range of 0 to $N_{symb}^{DL|UL}*N_{sc}^{RB}-1$ in the frequency domain and 1 is an index in the range of 0 to $N_{symb}^{DL|UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs thorough interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
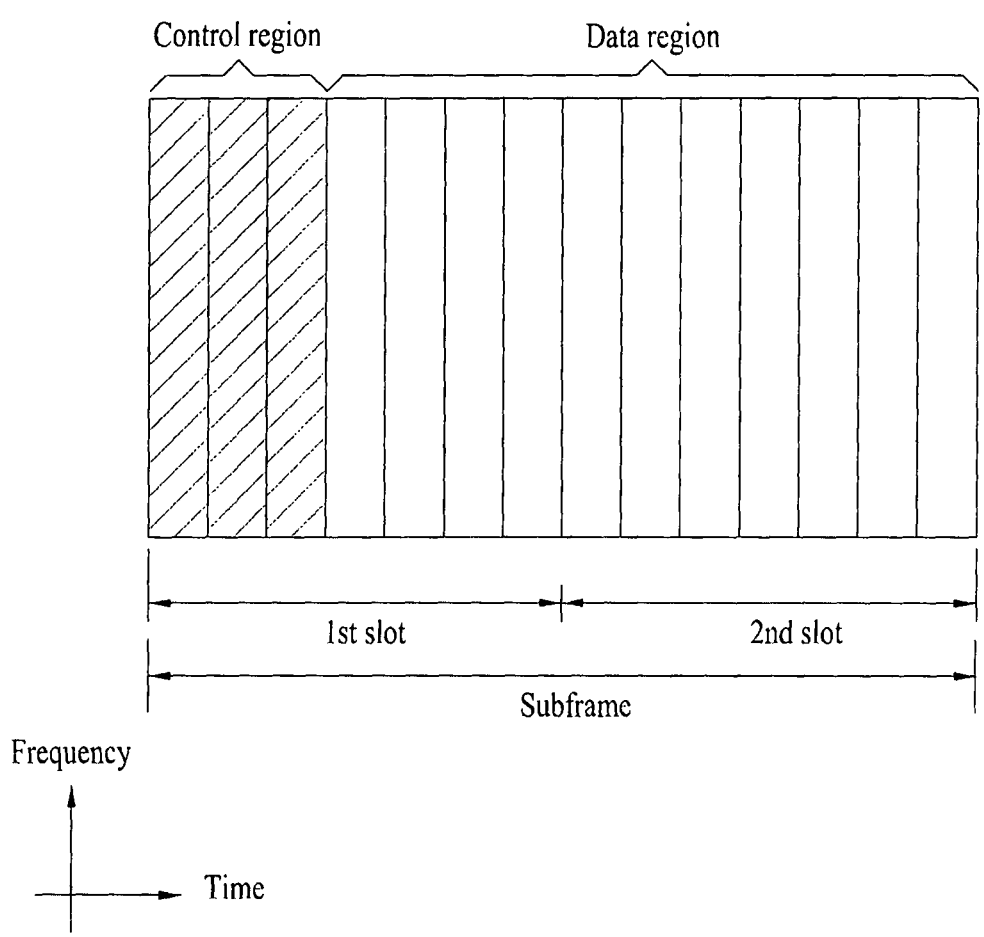
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
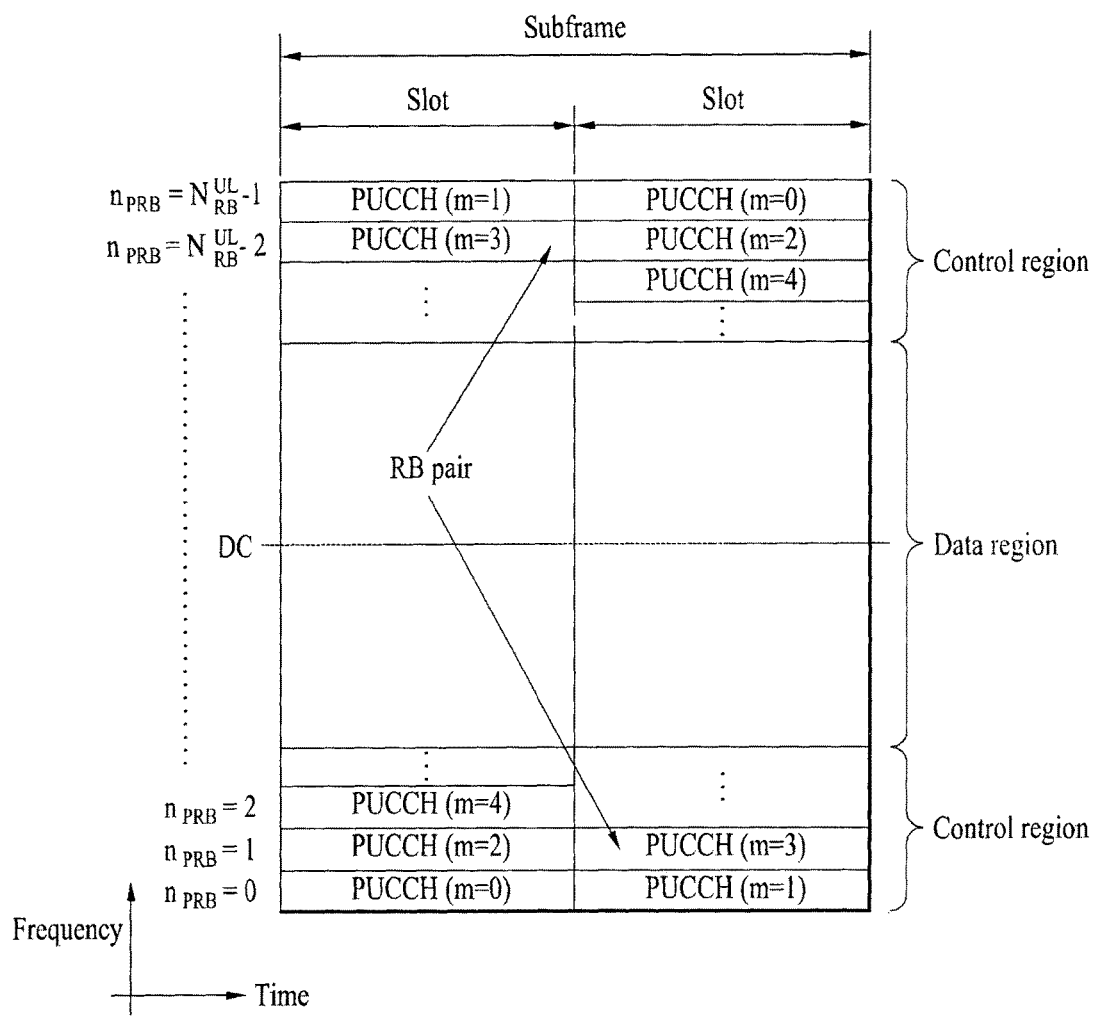
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Coordinated Multi-Point (CoMP) Transmission and Reception

According to improved system performance requirements of a 3GPP LTE-A system, CoMP transmission/reception technology (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by the coordination of the cells of the CoMP unit.

A plurality of UL points (that is, receiving points (RPs)) is referred to as UL CoMP and a plurality of DL points (that is, transmitting points (TPs)) is referred to as DL CoMP.

Enhanced-PDCCH (EPDCCH)

In an LTE system of LTE Release 11 or later, as a solution for PDCCH capacity lack due to CoMP, multi user-multiple input multiple output (MU-MIMO) and PDCCH performance reduction due to inter-cell interference, an enhanced-PDCCH (EPDCCH) which may be transmitted via a conventional PDSCH region is considered. In the EPDCCH, in order to obtain precoding gain, unlike to an existing CRS based PDCCH, channel estimation may be performed based on a DMRS.

EPDCCH transmission may be divided into localized EPDCCH transmission and distributed EPDCCH transmission according to the configuration of a PRB pair used for EPDCCH transmission. Localized EPDCCH transmission means the case in which enhanced control channel elements (ECCEs) used to transmit one piece of DCI are contiguous in the frequency domain and specific precoding is applicable in order to obtain beamforming gain. For example, localized EPDCCH transmission may be based on consecutive ECCEs corresponding in number to an aggregation level. In contrast, distributed EPDCCH transmission means that one EPDCCH is transmitted on a PRB pair separated in the frequency domain and has frequency diversity gain. For example, distributed EPDCCH transmission may be based on ECCEs each including enhanced resource element groups (EREGs) included each PRB pair separated in the frequency domain.

A UE may perform blind decoding similarly to an existing LTE/LTE-A system, in order to receive/acquire control information (DCI) via an EPDCCH. More specifically, the UE may attempt (monitor) decoding of a set of EPDCCH candidates per aggregation level, for DCI formats corresponding to a configured transmission mode. Here, the set of EPDCCH candidates to be monitored may be referred to as an EPDCCH UE-specific search space and this search space may be set/configured per aggregation level. In addition, differently from the above-described existing LTE/LTE-A system, {1, 2, 4, 8, 16, 32} is possible as an aggregation level according to subframe type, CP length, the amount of available resources in a PRB pair, etc.

A UE, in which an EPDCCH is configured, indexes REs included in a PRB pair set in EREG units and indexes the EREGs in ECCE units. The UE may determine EPDCCH candidates configuring a search space based on the indexed ECCEs to perform blind decoding, thereby receiving control information. Here, the EREG corresponds to an REG of the existing LTE/LTE-A system and the ECCE corresponds to a CCE. One PRB pair may include 16 EREGs.

In addition, for each serving cell, one UE may configure one or two EPDCCH PRB sets for PDCCH monitoring via higher layer signaling.

In 3GPP LTE Rel-11, a UE, to which a CoMP scheme is applied, may estimate channels of TPs, which may potentially participate in CoMP, using channel state information-reference signal (CSI-RS) resources defined as a CoMP measurement set and feed CSI such as precoding matrix indicator (PMI), channel quality indicator (CQI) or rank indicator (RI) back to a serving cell thereof based on the estimated channel values. A network may configure a dynamic point selection (DPS) scheme for selecting a TP having relatively excellent channel quality based on the fed-back CSI information to enable the UE to perform data transmission, a coordinated scheduling/coordinated beamforming (CS/CB) scheme for, at TPs participating in CoMP, controlling scheduling and beamforming to reduce mutual interference and a joint transmission (JT) scheme for, at TPs participating in CoMP, transmitting the same data to the UE.

The present invention relates to information provided by a network (or an eNB) and an inter-network coordination scheme in order to improve received signal performance of a UE including a high-performance receiver having interference cancellation (IC) capabilities.

In general, a cellular mobile communication system is an interference-limited system due to inter-cell interference in an urban environment and reaches system capacity limit. In addition, if a MIMO scheme, that is, an SU-MIMO scheme or a MU-MIMO scheme, is applied such that one eNB transmits a multi-layer signal of multiple beams, inter-layer interference in a cell is also a main factor for deciding system capacity limit. Therefore, in order to reduce inter-cell interference and intra-cell interference, standardization and development of a coordinated transmission and high-performance receiver scheme becomes important and numerous effects in that direction have been made.

A downlink CoMP scheme configures transmission beams such that inter-cell interference and intra-cell interference are minimized in a transmitter based on channel state information received from a receiver. In the downlink CoMP scheme, complexity of the UE in a data reception process is not increased, but performance of the CoMP scheme largely depends on accuracy of a channel state information report. The high-performance receiver scheme obtains better reception performance using properties of an interference signal at a receiver. In the high-performance receiver scheme, how the UE acquires information on the interference signal transmitted along with a signal (that is, a desired signal) scheduled thereto becomes important. Representative examples of the high-performance receiver scheme may include:

linear MMSE IRC receiver,
maximum likelihood detection receiver, and
interference cancellation receiver.

As performance increases, information on a larger number of interference signals is required. For example, in an iterative decoding interference cancellation receiver known to have highest performance, since a UE decodes an interference signal and regenerates an interference signal in order to cancel interference, all information for decoding the interference signal is necessary.

In the present specification, a method for cancelling an interference signal from a received signal after demodulating the interference signal without decoding will be focused upon. In particular, as a method for cancelling a co-scheduled interference signal, an interference cancellation method using a DM-RS of an interference signal on the assumption that a PDSCH is transmitted based on the DM-RS will be focused upon.

If a PDSCH co-scheduled to an RB scheduled to a specific UE is an interference signal, in order to cancel the interference signal, an eNB must provide information on the interference signal to a UE. In order to estimate an interference level using a DM-RS, the UE must know a sequence of the DM-RS of the interference signal. Therefore, the eNB must provide seed information of the sequence of the DM-RS of the interference signal to the UE and the UE estimates/cancels the interference signal using the seed information of the sequence of the DM-RS.

Figure 5:
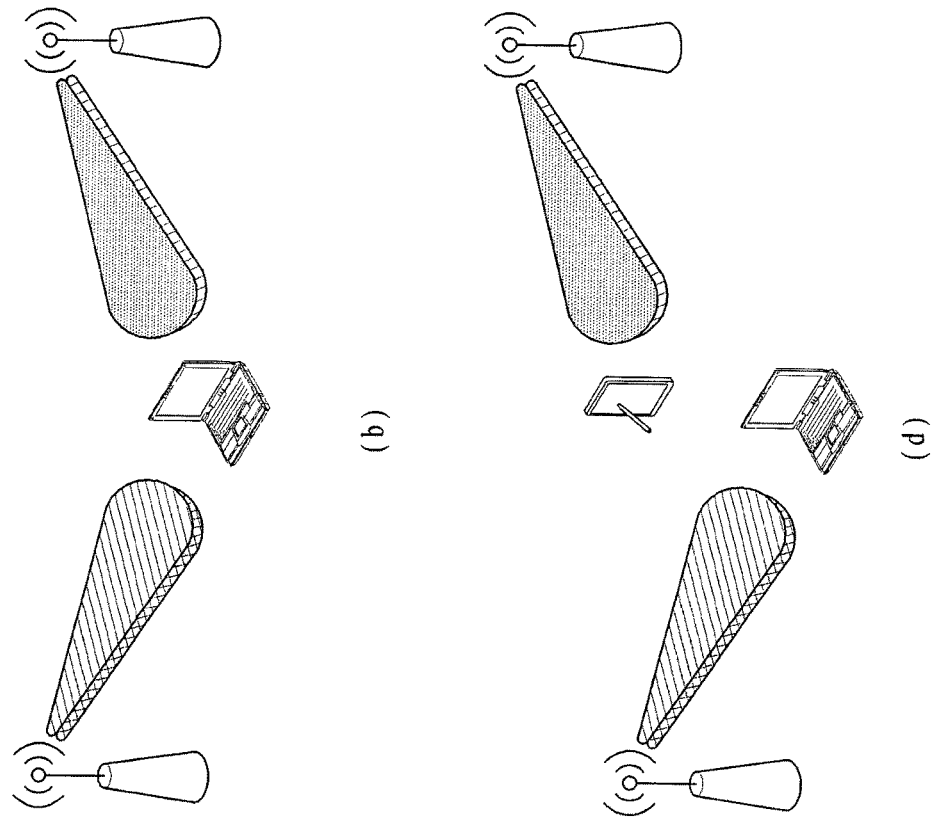
FIG. 5 shows various multi-input multi-output (MIMO) environments in a 3GPP LTE/LTE-A system.
Figure 5:
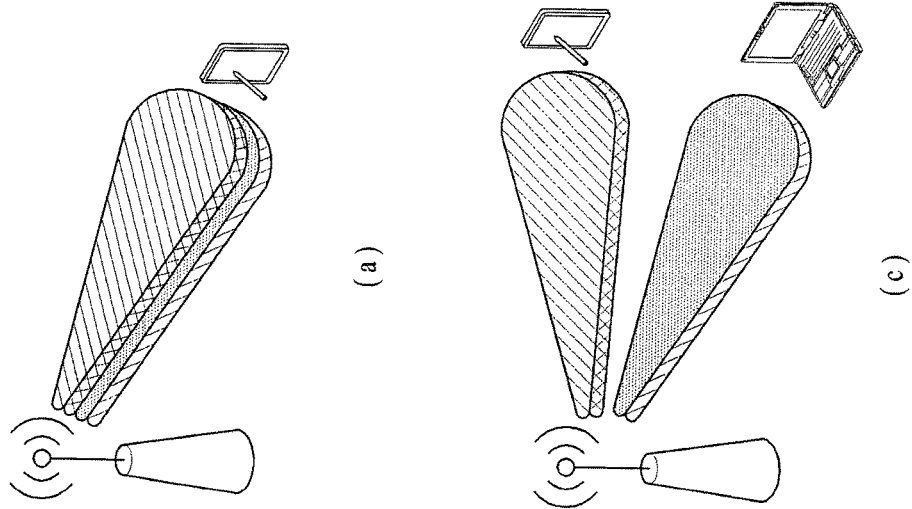

First, as interference received by a specific UE, there may be a signal of another layer scheduled to the specific UE. As shown in FIGS. 5(a) and 5(b), in case of single-cell SU-MIMO and multi-cell SU-MIMO, interference from another layer co-scheduled to a specific RB must be cancelled. In this case, all necessary information for interference cancellation is included in a DL control channel transmitted to a UE.

Unlike FIGS. 5(a) and 5(b), in FIGS. 5(c) and 5(d), when a UE receives control information of a PDSCH, control information of an interference signal is not received. FIGS. 5(c) and 5(d) show examples of single-cell SU-MIMO and multi-cell SU-MIMO, respectively. In the present specification, a method for improving interference cancellation performance of a receiver of a UE in the examples shown in FIGS. 5(c) and 5(d) is proposed.

Hereinafter, embodiment(s) of the present invention will be described. In the present specification, assume that a signal received by a UE includes a desired signal and an interference signal. That is, the desired signal is a downlink signal scheduled to the UE and the interference signal corresponds to a downlink signal scheduled to UE(s) different from the UE.

In addition, in the present specification, UE(s) scheduled to receive the interference signal is referred to as an "interference UE".

First Embodiment

First, in case of single-cell MU-MIMO of FIG. 5(c), since one eNB performs scheduling, coordination between eNBs is not necessary. Since both a desired signal (that is, a signal scheduled to a UE) and an interference signal are transmitted from a single eNB, if these two signals are based on a DM-RS, a seed value of a DM-RS sequence of the signals is selected from a single set $\{n_{IG}^{DMRS,0}, n_{ID}^{DMRS,1} N_{ID}^{cell}\}$. Accordingly, when the UE knows nSCID={0, 1} used for the interference signal, the DM-RS sequence may be generated and a channel value of the interference signal may be estimated using the generated DM-RS sequence. In addition, the eNB must signal all ranks of PDSCHs scheduled in a corresponding subframe in addition to the rank of the desired signal for the purpose of indicating DM-RS density used for scheduled PDSCH transmission PRBs. Additionally, the eNB may inform the UE of a modulation order of the interference signal transmitted to the interference UE in addition to the rank used per nSCID in the corresponding subframe (or the number of scheduled layers) and information on the desired signal to the specific UE. When the interference signal is transmitted using two codewords and the modulation orders of the two codewords are the same, the eNB may inform the UE of one modulation order value and that the modulation orders are the same, thereby reducing signaling overhead.

In summary, in the embodiment shown in FIG. 5(c), the eNB may provide the following information to the UE such that the UE estimates interference using the RS of the interference signal.

When the interference signal is a DM-RS based PSDCH,
whether nSCID used to generate the DM-RS sequence of the interference or nSCID which is not used for the desired signal is used for the interference signal
number of layers (ranks) per nSCID
total number of ranks scheduled in the corresponding subframe
modulation order per codeword (nSCID)

when the interference signal is a CRS based PDSCH,
seed value (physical cell identifier) information of a CRS sequence of the interference signal, the number of CRS ports, CRS frequency shift and MBSFN configuration information
transmitted PMI (TPMI) information of the interference signal
PMI restriction information: This enables the interference eNB to use only a specific PMI set to aid interference estimation. In single-cell operation, codebook restriction information may be delivered. In multi-cell operation, such information should be transmitted between eNBs and should be delivered to the UE. Alternatively, this indicates that a specific TPMI is not used. The UE may blindly detect PMI of the interference UE in the restricted set.

Information on the interference signal may be dynamically transmitted in a state of being included in downlink control information (DCI) of the desired signal. The eNB transmits control information of the desired signal and control information of the interference signal when transmitting control information to the UE. For example, as shown in Table 5 below, the eNB provides additional information (DCI) for interference cancellation to the UE and the UE estimates an interference level using the additional information and cancels interference from a received signal.

TABLE 5

| Existing DCI | Additional DCI (control information for interference cancellation) |
|---|---|
| Control information of UE (RB allocation, TPC, HARQ, {MCS, NDI, RV" for CW1, {MCS, NDI, RV} for CW2} | Information on interference UE(s)/layer(s) (nSCID, number of layers (ranks) per nSCID, modulation order per codeword, all ranks) |

Second Embodiment

Hereinafter, an embodiment of network signaling for aiding interference cancellation of a UE when a network performs multi-cell MU-MIMO scheduling as shown in FIG. 5(d) will be described. In the scenario shown in FIG. 5(d), a plurality of UEs is scheduled to the same PRB and a target UE receives supplementary information (or control information) for cancelling an interference signal from a serving cell thereof in order to increase reception performance of a desired signal.

Prior to a detailed description, in order to provide the supplementary information for cancelling the interference signal to the target UE in the scenario shown in FIG. 5(d), since scheduling information of a neighbor eNB should be known, network coordination between eNBs is necessary. A coordination degree between eNBs and the type of information signaled to the UE may be changed according to speed and latency of a backhaul link between eNBs.

The backhaul link may roughly be divided into three types.

Ideal backhaul (non-X2) link: As considered in existing LTE Rel.11 CoMP, coordinated eNBs establishes a CoMP cluster and cells in the same CoMP cluster are connected via a backhaul link such as an optical fiber having high capacity and low latency for coordinated scheduling and coordinated data transmission and reception, such that coordinated scheduling is possible, and accurate time synchronization is performed such that coordinated data transmission is possible. In addition, when signals transmitted from cells in the CoMP cluster participating in coordinated transmission are received, it may be assumed that a difference between reception times of signals transmitted from cells due to a propagation delay difference between the cells is in a cyclic prefix (CP) length of an OFDM symbol. In this case, in order to aid interference cancellation of the UE in every subframe, necessary information including dynamic information which may be changed according to subframe may be more accurately provided to the UE via dynamic signaling.

Slow backhaul: This is a general backhaul link having latency of several ms to several tens of ms, in which dynamic information transmission for inter-eNB coordination is impossible. In this link, only coordination such as deliver of semi-static information to neighbor eNB is possible as inter-eNB coordination.

Fast backhaul: This is between the ideal backhaul link and the slow backhaul link and certain fast inter-eNB coordination (for example, latency is equal to or less than 1 ms) may be possible. In addition to information on semi-static neighbor eNBs, restrictive information may be provided to the UE via dynamic signaling to aid interference cancellation of the UE.

As shown in FIG. 5(d), in multi-cell MU-MIMO, the target UE receives the following information from the network in order to cancel the interference signal. Similarly to FIG. 5(c), a method for demodulating the interference signal without decoding to cancel and/or suppress interference will be focused upon.

2-1. Case in Which Interference Signal is DM-RS Based Signal

When the amount of interference of the interference signal is estimated and cancelled using a DM-RS, a seed value of a DM-RS sequence is necessary. This seed value includes a cell ID value (a vertical cell ID and a physical cell ID) and nSCID information used when a neighbor cell generates a DM-RS sequence used for UE scheduling upon interfering with the neighbor cell. In addition, in order to increase DM-RS estimation performance, a channel estimate of a CSI-RS and a CRS having density higher than that of a DM-RS may be used and information thereon is necessary. In LTE Rel. 11, this is defined as quasi co-location assumption and is signaled to the UE. That is, the eNB may provide, to the target UE, with which CSI-RS or CRS the QCL assumption of an interference DM-RS sequence is possible. In order to check the density of the DM-RS in a corresponding subframe, the target also requires all rank information in a PRB scheduled in the corresponding subframe. The same effect can be obtained by signaling rank information per (VCID and nSCID) pair to the UE. In addition, a modulation order per codeword of the interference signal may be signaled to the target UE.

Hereinafter, a method for signaling the above-described information will be described. Although a detailed signaling scheme may be changed according to the speed and latency of the backhaul link, a signaling scheme considering a slow backhaul link to a signaling scheme considering an ideal backhaul link are proposed in the present specification.

Even when it is difficult for eNBs to exchange dynamic information such as UE scheduling information changed according to subframe, it is possible to semi-statically provide supplementary information for interference signal cancellation to the UE. That is, the eNB may select a candidate group of cells which may interfere with the target UE, receive DM-RS sequence information and QCL information used by the cells from the cells, configure a set of supplementary information for interference signal cancellation and provide the set of supplementary information to the target UE via higher layer signaling. In addition, the eNB may explicitly inform the UE of one of the set of supplementary information (as "bit value" of Table 6 below). The target UE may estimate and cancel the interference signal based on one of the set of supplementary information.

When the eNBs may exchange dynamic information such as UE scheduling information changed according to subframe, the eNB may check the properties of the interference signal to be transmitted on the current subframe via information exchange with the neighbor cell and select and transmit some of the set of supplementary information already provided via physical layer signaling to the target UE, and the target UE may detect the DM-RS sequence of the interference signal in some of the set to perform interference estimation.

In the above-described two cases, the target UE uses the set of supplementary information received from the eNB to detect whether the interference signal (that is, an interference PDSCH signal) in the candidate set is present in the corresponding subframe. That is, the supplementary information indicated by the PDCCH may be used in the former case and some (subset) of the set of the supplementary information may be used in the latter case. The target UE uses the received supplementary information (e.g., CRS or DM-RS sequence information, QCL information, etc.) to determine whether a reference signal exceeding predetermined reception energy is detected in the corresponding subframe. The target UE estimates an interference channel from the detected reference signal exceeding the predetermined reception energy, detects an interference PDSCH transmitted therewith, and cancels the detected reference signal and an interference PDSCH signal from the entire received signal.

Table 6 below shows an example of information delivered via semi-static signaling of such information.

TABLE 6

| | DM-RS information | | | Rate Matching information | | | | | |
|---|---|---|---|---|---|---|---|---|---|
| | VCID | | | | QCL assumption | CRS information | | | |
| Bit value | (virtual cell ID) ∈{0, 1, 2, ..., 503} | nSCID ∈{0, 1} | Rank Restriction | (non-zero power) CSI-RS index | PCID (Physical Cell ID) | (CRSPortsNumber, FrequencyShift, MBSFNsubframe pattern) | (NZP) CSI-RS index | ZP CSI-RS index | PDSCH starting Symbol index | Modulation order restriction |
| 0 | nVCID (0) | {0, 1} | — | CSI-RS index(0) | nPCID(0) | PortNum0, Freqshift0, MBSFN_ subframe_0 | | | 2 | — |
| 1 | nVCID (1) | {0} | 1 | CSI-RS index(1) | | PortNum1, Freqshift1, MBSFN_ subframe_1 | | | 1 | 2 |
| 2 | nVCID (2) | {0} | 2 | | nPCID(2) | PortNum2, Freqshift2, MBSFN_ subframe_2 ... | | | 3 | 4 |

Seed Value Set of DM-RS Sequence

The eNB determines a candidate set which may cause dominant interference with the target UE and transmits the candidate set to the target UE as shown in Table 6. First, a VCID having a value in a range from 0 to 503, which is a seed value of a DM-RS sequence, and an nSCID having any one of 0 or 1 are provided to the target UE. The VCID and the nSCID are referred to as "DM-RS related information". nSCID may have a value of 0 or 1. If both nSCID values 0 and 1 corresponding to the VCID are used, the UE may be informed of these two values. Alternatively, the UE may not be informed of the nSCID value corresponding to the VCID. That is, when the UE is informed of both the nSCID values 0 and 1 corresponding to nVCID(0) in Table 1 above, the UE may generate a DM-RS sequence using nVCID(0) and nSCID=0 to estimate interference and generate a DM-RS sequence using nVCID(0) and nSCID=1 to estimate interference.

If the nVCID(0) value is signaled and the nSCID field value is omitted, the UE generates the DM-RS sequence with respect to all nSCID values (e.g., 0 and 1) corresponding to nVCID(0) to estimate interference. However, in Table 6, if the nSCID value corresponding to a specific VCID is restricted to one value, that is, bit value=1, the UE assumes that the DM-RS sequence of the interference signal using the VCID is generated using the specified nSCID only and performs interference estimation of the DM-RS sequence generated using the specified nSCID only. For example, since only nSCID={0} is signaled with respect to nVCID(1), interference estimation using the DM-RS sequence is performed with respect to nVCID(1) in consideration of nSCID=0 only.

Rank Restriction

Rank restriction information may indicate restriction of the rank of the interference signal using the DM-RS. If information on this field is omitted, the UE may blindly detect rank information of the interference signal corresponding to the DM-RS seed value and use the rank information for interference cancellation. However, if a specific rank value is signaled in a rank restriction field, the UE is informed that a maximum rank is restricted to the specific rank value. Accordingly, the UE assumes that the rank greater than the value signaled with respect to the DM-RS sequence (the DM-RS sequence by the signaled VCID value and nSCID) corresponding to the seed value is not used and does not detect the interference DM-RS sequence with respect to the rank greater than the signaled value. For example, in Table 6 above, in case of bit value=0, nSCID=0 and nSCID=1 are used with respect to nVCID(0) to inform the UE that the interference DM-RS sequence may be used. If both nSCID values {0, 1} are signaled without rank restriction, the DM-RS sequence may be blindly detected from rank=1 to rank=8 with respect to nVCID(0) and nSCID0 and may be detected from rank=1 to rank=2 with respect to nSCID1, thereby performing IC. When the rank is restricted with respect to each nSCID value, a maximum rank value supported by each value is predetermined between the eNB and the UE and, when the rank restriction field value is not signaled, the UE blindly detects the DM-RS sequence up to the predetermined maximum rank. In 3GPP Rel.11, the maximum rank is restricted to 8 in case of nSCID=0 and is restricted to 2 in case of nSCID=1.

When bit value=1 in Table 6 above, nSCID is restricted to 0 with respect to nVCID(1) and, at this time, the rank restriction field is 1. In this case, the UE is informed that the rank is restricted to 1 with respect to the interference DM-RS sequence in case of nVCID(1) and NSCID=0. Thus, the UE performs the IC operation with respect to the DM-RS sequence in consideration of rank=1 only without considering interference in case of rank=2. In order to provide such rank restriction information to the UE, rank coordination between eNBs is necessary. That is, information indicating that a rank greater than a predetermined rank is not scheduled with respect to a specific DM-RS sequence, that is, that a specific rank or less is scheduled, during a predetermined time should be exchanged between eNBs.

Modulation Order or MCS Restriction

Modulation order restriction information indicates whether the modulation order of the interference signal using the DM-RS sequence is restricted. If information on this field is omitted, the UE blindly detects the modulation order of the interference signal corresponding to the seed value of the DM-RS sequence and uses the modulation order for interference cancellation. However, when a specific modulation order value is signaled in the modulation order restriction field, the UE is informed that a maximum modulation order is restricted to the specific modulation order and the UE blindly demodulates the DM-RS of the interference signal using the specific modulation order value or less. Here, modulation order={2, 4, 6} indicate QPSK, 16 QAM and 64 QAM, respectively. Of course, a higher modulation order value may be signaled. For example, with respect to the DM-RS having a modulation order restriction value of 4, the UE indicates that the DM-RS is modulated with QPSK or 16 QAM. The UE performs demodulation on the assumption that that the DM-RS is modulated with QPSK to detect coordinates in constellation, performs demodulation on the assumption that the DM-RS is modulated with 16 QAM to detect coordinates in constellation, determines with which of the two modulation order values modulation is performed, and estimates a channel of an interference signal using the modulation order, thereby cancelling interference.

As another embodiment, the maximum modulation order is set but, instead, a modulation order may be accurately specified to 2, 4 or 6. A specific modulation order may be indicated. In this case, the UE performs modulation using the specific modulation order only, thereby increasing interference cancellation efficiency. Additionally, blind decoding may be performed using the indicated modulation order.

Similarly, instead of modulation order restriction, modulation and coding scheme (MCS) information may be signaled to the UE. The UE is not informed of the modulation order only, but is informed of the modulation order and a code rate. That is, the UE is informed that the MCS is restricted to a specific value or less. Accordingly, the UE is aware that the interference signal corresponding to the seed value of the DM-RS sequence is modulated and coded at the specific MCS level or less, blindly detects the modulation and code rate of the interference DM-RS sequence in a given range only, and estimates the channel of the interference signal using the DM-RS, thereby cancelling interference. The MCS table for the PDSCH defined in current LTE Rel.11 is a combination of a modulation order and a transport block size (TBS) index.

TABLE 7

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

That is, the MCS index indicates the modulation order and the TBS index, the modulation order has values of {2, 4, 6}, which indicate QPSK, 16 QAM and 64 QAM, respectively. The TBS index is an indirect code rate indicator and the code rate may be determined according to PDSCH RB allocation and the number of layers. Accordingly, in the present invention, when MCS restriction information is provided, the MCS is restricted to less than specific value, that is, $I_{MCS}<10$, or the MCS restriction such as $10 \leq I_{MCS} \leq 16$ is provided, such that the modulation order is precisely restricted. Accordingly, it is possible to perform blind decoding within the indicated modulation order. Such MCS restriction information may be used not only for a demodulation based IC receiver but also for a code based IC receiver.

In order to provide the modulation order or MCS restriction information to the UE, coordination for modulation order or MCS between eNBs is necessary. That is, information indicating that a greater than predetermined modulation order or MCS level is not scheduled with respect to a specific DM-RS sequence, that is, that a less than predetermined modulation order or MCS level is scheduled, or indicating that a predetermined modulation order or MCS level is scheduled during a predetermined time should be exchanged between eNBs. Information on the modulation order or MCS level restriction is equally applicable to a CRS based PDSCH interference signal. When the modulation order and MCS level restriction information is signaled with respect to a PDSCH modulated with a specific CRS, the UE may perform the above-described operation on the assumption that the modulation order or MCS level of the interference signal is restricted to the signaled value or less.

DM-RS Sequence with Restrictions

For interference cancellation of the UE, rank restriction or modulation order (or MCS level) restriction between eNBs is set in order to enable the target UE to accurately demodulate and/or decode the interference signal. In general, since the reception SNR of the interference signal is lower than the reception SNR of the desired signal, the UE may not detect and cancel the interference signal by providing information on the interference signal only. In order for the target UE to demodulate and/or decode the interference signal, IC is accurately performed by decreasing the rank and the modulation order or the MCS level, thereby increasing reception performance of the desired signal. As a result, in a structure in which the UE is enabled to perform IC via network coordination, a maximum rank or a high modulation order (or MCS) may not be used even when the signal of the UE is scheduled. Accordingly, the eNB may separately manage DM-RS sequences and resources in order to improve overall system throughput and UE throughput. That is, a PDSCH may be scheduled to UEs, which are located at the center of a cell to have good geometry, using a DM-RS sequence without rank or modulation order restriction and may be scheduled to UEs, which are located at the edge of the cell to interfere with a neighbor cell, using a DM-RS sequence with rank or modulation order restriction.

QCL Assumption

In order to increase performance of interference channel estimation using a DM-RS sequence, the eNB provides QCL assumption. QCL assumption is to use a channel property value of another RS having a channel property equal to or similar to that of a specific DM-RS sequence while the density of an RS is higher than that of the DM-RS to increase channel estimation performance of the DM-RS sequence in interference channel estimation of the specific DM-RS sequence. QCL for each antenna port is defined in 3GPP LTE Rel.11. With respect to QCL, two behaviors are defined: Behavior A in which a CRS, a DM-RS and a CSI-RS are transmitted from a serving cell and all antenna ports have the same channel property and Behavior B in which a DM-RS has the same channel property as a specific CSI-RS in modulation of the PDSCH. In Behavior B, QCL between the DM-RS and the CSI-RS and QCL with a specific CRS in a frequency property may be signaled to the UE.

Accordingly, QCL assumption may be delivered with respect to each sequence in a DM-RS sequence candidate group and, for example, a DM-RS sequence and a specific (non-zero power) CSI-RS index may be mapped and delivered. The method of one embodiment of the present invention is not limited to the CoMP structure defined in 3GPP LTE Rel. 11 and thus the CSI-RS index is not limited to the CSI-RS configured for CSI feedback of the UE in the CoMP scheme. Since the UE may not feed CSI back in response to the signaled CSI-RS index, the number of CSI-RSs to be measured by the UE is unnecessarily increased in order to obtain the channel property of the CSI-RS as information aiding estimation of the specific DM-RS sequence. Accordingly, as QCL information for estimating the interference channel of the specific DM-RS sequence, information from a CRS of a specific cell is preferably referred to in addition to the CSI-RS. That is, for QCL assumption, a CSI-RS index or a PCID of a specific cell may be signaled to obtain the channel property from the CRS of the cell.

In case of CoMP scenario 4, since TPs having different locations share the same PCID, signaling only the PCID for QCL assumption is inappropriate. Accordingly, in this case, a CSI-RS index is signaled to the UE. In summary, for QCL assumption, a CSI-RS index or a PCID may be signaled and the UE refers to a channel property from the CSI-RS using the CSI-RS index or the PCID signaled in QCL assumption information only or refers to a channel property using a CRS corresponding to the PCID. If both the CSI-RS index and the PCID are signaled in the QCL information for the specific DM-RS sequence, it is indicated that the specific DM-RS sequence is in a QCL relationship with the signaled CSI-RS index and the CRS corresponding to the signaled PCID. That is, the DM-RS may be in a QCL relationship with the signaled CSI-RS index and, in some cases, may be in a QCL relationship with the CRS corresponding to the signaled PCID. Accordingly, the UE estimates interference, detects an interference signal and cancels interference with respect to each case.

When the CSI-RS index is signaled to the UE for QCL assumption as shown in Table 6 above, the eNB should separately signal a CSI-RS configuration for long-term measurement and QCL assumption to the UE in addition to a CSI-RS configuration for CSI measurement. The CSI-RS configuration may include CSI-RSs for CSI measurement.

Rate Matching Information

For the purpose of signaling PDSCH RE mapping of the interference signal and occurrence of CRS interference in a specific RE, CRS information of a neighbor cell is also transmitted. The CRS information includes the number of CRS antenna ports, CRS frequency shift ($=\{0, 1, 2, \ldots, 5\}$) and MBSFN subframe pattern, etc. If the UE is informed that CRS interference occurs to cancel the CRS interference, a physical cell ID of the CRS is signaled instead of CRS frequency shift. That is, by signaling the physical cell ID, the number of CRS antenna ports and the MBSFN subframe pattern as CRS information, the UE is enable to cancel the CRS interference at the CRS location if the UE has CRS interference control capabilities.

In addition, for the purpose of signaling whether interference is caused from an interference signal in a specific RE, CSI-RS information and ZP CSI-RS information of a neighbor cell may also be signaled to the UE. That is, since the PDSCH of the interference signal is not mapped, the UE is prevented from performing IC with respect to the corresponding RE, thereby preventing performance deterioration.

In addition, a CRS-RS index for signaling a PDSCH rate matching pattern of the interference signal may be separately signaled. As another method, a CSI-RS index indicated for QCL assumption may be used. For example, in Table 6 above, since the PDSCH of the interference signal using the DM-RS sequence generated using nVCID(0) and nSCID={0, 1} when the bit value is 0 is in a QCL relationship with the CSI-RS index (0), the UE may obtain the channel property from the CSI-RS index (0) and recognize that the PDSCH of the interference signal corresponds to the CSI-RS index (0) and is transmitted after subjected to rate matching. In this case, separate CSI-RS index signaling for rate matching information is not necessary. If the CSI-RS index for QCL and the separate CSI-RS index for rate matching information are separately signaled, rate matching of the interference signal assumed by the UE follows the separately transmitted CSI-RS index for rate matching information. In Table 6 above, a plurality of CSI-RS indices for providing rate matching information may be signaled. According to UE capabilities, a CSI-RS index received as rate matching information may be used or a QCL CSI-RS index may be used to perform interference cancellation with respect to the CSI-RS in the RE on which the corresponding CSI-RS is transmitted.

Further, a ZP CSI-RS index used for interference signal transmission may also be transmitted to the UE. The signaled ZP CSI-RS may be muted or mapped to the PDSCH depending on to which UE the interference eNB schedules a PDSCH. Through such signaling, the target UE may be informed that the PDSCH may be mapped to the ZP CSI-RS or that the ZP CSI-RS may be muted. The UE is disabled to perform IC with respect to the corresponding REs using the ZP CSI-RS or is enabled to determine whether IC is performed with respect to the REs in the ZP CSI-RS via energy detection. Except for the signaled CRS index and CSI-RS index, unless there is separate signaling and restriction (e.g. PSS/SSS/PBCH transmission, positioning RS transmission, MBSFN subframe, etc.), the UE is informed that the PDSCH is transmitted in a region other than the signaled ZP CSI-RS. The UE, which has received this information, assumes that the PDSCH is transmitted in the region except for the ZP CSI-RS.

In general, the ZP CSI-RS is configured to cover a configured CSI-RS. Accordingly, as rate matching information of a separate interference signal, information indicating that the ZP CSI-RS covers the CSI-RS transmission location may be signaled to the UE without transmitting the CSI-RS information. That is, information indicating that the PDSCH may or may not be transmitted is included in the signaled ZP CSI-RS.

If the ZP CSI-RS of the interference is not separately signaled, the UE may consider that the PDSCH of the interference signal may not be mapped to one or a plurality of ZP CSI-RSs configured therefor and may not unconditionally perform IC with respect to the corresponding REs. Detailed ID operation of the corresponding REs follows UE implementation.

PDSCH Starting Symbol Index

When interference received from another eNB is cancelled, PDSCH starting symbols of an interference signal and a desired signal should be aligned between eNBs in advance. Cancellation of interference due to a CRS based PDCCH of a neighbor cell using a DM-RS based PDSCH is not preferable. Since the PDSCH starting OFDM symbol is changed according to the amount of control information transmitted via a PDCCH and load of a corresponding eNB in every subframe, dynamic signaling of the PDSCH starting symbol of the neighbor cell is very burdensome. Accordingly, the eNB may signal the PDSCH starting symbol index to the UE via semi-static signaling per DM-RS sequence. Here, the PDSCH starting symbol index means that the interference signal using the corresponding DM-RS sequence does not have a PDCCH of the interference signal after the signaled PDSCH starting symbol. For example, when the bit value is 0 in Table 6, PDSCH starting symbol index=2 is signaled, which means the PDCCH of the interference signal transmitted by the eNB using the DM-RS sequence corresponding to nVCID(0) is not transmitted after the signaled PDSCH starting symbol index=2. The UE is informed that PDCCH may be transmitted (the PDSCH may be transmitted) when the OFDM symbol index=0 or 1 but may not be transmitted when the OFDM symbol index 2. Then, when the desired signal of the UE starts from the OFDM symbol index=1 and a signal using a DM-RS sequence having nVCID(0) as a seed value of the DM-RS sequence is received as strong interference, the UE may perform demodulation without performing IC with respect to the OFDM symbol index=1 and may perform IC and perform demodulation with respect to the subsequent OFDM symbol indices thereof. In other words, when the PDSCH starting symbol index information is received, the UE performs IC only in a region in which the PDSH is ensured to be transmitted and performs modulation without IC in the other region. At this time, a weight of the region in which modulation is performed without IC may be lowered to reduce loss.

As another embodiment of the present invention, the UE may assume that a PDSCH of a neighbor cell always starts after a symbol to which a PDSCH transmitted thereto is mapped, without separate signaling for the PDSCH starting symbol index shown in Table 6. eNBs should exchange information on the PDSCH starting symbol index in advance and, as described above, information indicating that the PDCCH is not transmitted after a specific OFDM symbol index should be exchanged along with subframe information (e.g., a subframe pattern) having valid information.

As another embodiment of the present invention, each eNB maximally conservatively assumes a PDSCH starting symbol index. The UE may assume that neighbor cells use a maximum number of OFDM symbols which may be used by a serving cell thereof for PDCCH transmission and perform IC for the PDSCH at subsequent symbols thereof. At this time, the UE assumes that bandwidths and frame structure types of the neighbor cells which interfere with the serving cell thereof are the same.

Similarly, coordination for transmission locations of the PDSCH and the EPDCCH may be exchanged between eNBs in advance. The EPDCCH may be demodulated using a DM-RS similarly to a PDSCH. In the EPDCCH, since control information of a maximum of four UEs may be multiplexed in one RB, it is difficult to perform interference cancellation in PRB units or bundled PRB units. Accordingly, when the UE cancels the interference signal in order to improve reception performance of the desired signal thereof, the UE assumes that a PDSCH of another UE or another layer is transmitted as the interference signal unless separate information is received and performs interference cancellation. A region in which the PDSCH is transmitted and a region in which the EPDCCH is transmitted are preset and information thereon is exchanged between eNBs in advance. In a specific frequency domain or a specific time-frequency domain, information indicating that the EPDCCH of the eNB is transmitted is exchanged.

2-1-1. Signaling Optimization

In case of fast backhaul link, the eNB may transmit, to the UE, information dynamically aiding interference cancellation in every subframe along with semi-static signaling. For example, even when the UE receives information on eight candidate seed values 1 to 8 of the sequence of an interference DM-RS, the number of candidates may be reduced by providing information indicating that only the seed values 2 to 4 are used via dynamic signaling. In some cases, the eNB may transmit only the seed value of one DM-RS sequence to the UE to accurately inform the UE of the DM-RS sequence of the interference signal. Alternatively, rank information (information on the number of layers of the interference signal) may be indicated via dynamic signaling. At this time, rank information signaled to the UE may be changed according to the number of layers of the interference signal which may be cancelled by the UE.

2-1-2. DM-RS Sequence Detection Procedure—Using Received Signal Power of RSs Used as QCL Assumption As another embodiment of the present invention, although the UE, which has received information on the interference signal shown in Table 6 above, may blindly detect the DM-RS sequence of the interference signal, the UE may use a CRS of a physical cell ID or a CSI-RS index which is signaled to be used as QCL assumption when the DM-RS sequence of the interference signal is detected. That is, using the CSI-RS or CRS as QCL assumption means the UE periodically or aperiodically measure the CSI-RS or CRS. At this time, only when the intensity of the received CSI-RS or CRS is equal to or greater than a predetermined level, it may be determined the DM-RS associated with the CSI-RS and the CRS may act as interference. Accordingly, the DM-RS acting as interference may be preferentially detected to estimate an interference channel and then IC may be performed.

2-1-3. PRB Bundling Alignment

When information aiding interference cancellation is received to cancel an interference signal from a received signal, PRB allocation of the interference signal should be additionally considered. A frequency domain occupied by a desired signal and a frequency domain occupied by an interference signal should be considered. That is, even when a DM-RS sequence for an interference signal is detected and interference is estimated using the DM-RS sequence, whether estimated interference can be cancelled with respect to all PRBs to which the desired signal is allocated should be considered.

For example, when the UE detects a DM-RS sequence A as an interference signal with respect to a specific interference signal A and cancels the interference signal from the received signal using the DM-RS sequence A, if the desired signal is allocated two consecutive PRBs and the interference signal A is allocated four consecutive PRBs, the UE cancels the interference signal from all PRBs allocated thereto. However, if the desired signal is allocated four consecutive PRBs and the interference signal A is allocated two consecutive PRBs, since it is not possible to ensure that the interference signal A is equally present in all the PRBs allocated to the UE without receiving information thereon, the UE may not cancel the interference signal.

Accordingly, unless resource allocation information of the interference is directly signaled, granularity for interference cancellation of the UE should be predetermined between eNBs and should be used for resource allocation of one UE. Preferably, a PRB bundling size and an interference cancellation unit should be the same. That is, on the assumption that the resource allocation of the serving cell is performed in PRB bundling units and resource allocation of the neighbor cell is performed in the same PRB bundling units, it is possible to cancel interference using allocated resources. In this case, the PRB bundling size and resource allocation unit should be predetermined between eNBs.

A specific RS sequence may assume PRB bundling and another RS sequence may not assume PRB bundling. In other words, whether PRB bundling is assumed per RS sequence is determined. That is, as shown in Table 6 above, when information on the DM-RS of the interference signal is provided, the eNB may signal information indicating whether PRB bundling is assumed per DM-RS sequence to the UE.

In order for the UE to perform interference cancellation in PRB bundling units, the channel of the interference signal is equally maintained within the bundled PRB. Accordingly, resource allocation in the bundled PRB is not of a distributed type but is of a localized type. The UE which knows such information may perform IC in a specific bundled PRB in which localized resource allocation is performed. The UE may not perform IC in a specific bundled PRB in which distributed resource allocation is performed. Accordingly, in resource allocation between eNBs, coordination between eNBs that distributed resource allocation is performed in a specific frequency domain and localized resource allocation is performed in a specific frequency domain is performed in advance.

In addition, a PRB bundling size may be changed. Resources may be allocated in a specific subframe in M PRB bundling units and may be allocated in another specific subframe in N PRB bundling units. Alternatively, resources may be allocated in a specific subframe in M PRB bundling units and may be allocated in another specific subframe in PRB units.

2-1-4. Heterogeneous Network (HetNet) Support

In a heterogeneous network (HetNet), when the information described in the present specification is provided to the UE in order to cancel the interference signal, additional information for interference cancellation may be provided. That is, when a macro eNB manages an almost blank subframe (ABS), a specific macro eNB may determine whether a PDSCH is transmitted according to an ABS pattern of the macro eNB. If the PDSCH is transmitted in the ABS with low transmit power, the signal is unlikely to be act as a dominant interference source of neighbor pico UEs. Accordingly, an interference candidate group shown in Table 6 above may be distributed and signaled to the UE according to the ABS pattern.

For example, the pico UE is informed of a plurality of subframe sets and an interference candidate group distributed to each subframe set. The interference candidate group means information shown in Table 6 above. The information shown in Table 6 above may be signaled per subframe set. Alternatively, the macro eNB may signal the information shown in Table 6 above with respect to the subframe set corresponding to the ABS only.

All or some of the information described in 2.1 and subsequent chapters thereof may be transmitted to the target UE.

2-2. Case in Which Interference Signal is CRS Based Signal

If the interference signal is a CRS based PDSCH, information signaled by the network in order to enable the target UE to cancel the CRS based interference signal from the received signal will now be described. Since the interference signal is a CRS based PDSCH, a seed value of a CRS sequence is first obtained. This seed value is a physical cell ID of a cell for transmitting the CRS causing interference. Further, the UE needs to know a MBSFN subframe configuration in order to know the number of CRS ports, the locations of the CRS ports, information on presence/absence of the CRS, a transmission scheme in a subframe in which the CRS is not present and RS information.

Since transmit power of the CRS may be different from actual PDSCH transmit power, a ratio of PDSCH transmit power to the CRS transmit power needs to be signaled to the target UE. As the ratio of PDSCH transmit power to the CRS transmit power, both a ratio of a symbol on which the CRS is transmitted and a ratio of a symbol on which the CRS is not transmitted need to be signaled.

When the physical cell ID of the cell for transmitting the CRS, the number of CRS ports, the locations of the CRS ports and the information on presence/absence of the CRS are referred to as "CRS related information", the target UE may estimate an interference signal channel using the signaled CRS related information and determine whether CRS based PDSCH interference is present using the signaled ratio of PDSCH transmit power to the CRS transmit power.

If the interference signal is a CRS based PDSCH, the UE for cancelling the interference signal should know a transmitted precoding matrix index (TPMI) used to transmit the interference signal. However, it is difficult to provide the TPMI which is dynamically changed according to a channel state in every subframe. However, when the TPMI of a specific UE is fixed, performance of the UE may deteriorate. In addition, enabling the target UE to blindly detecting PMI which is actually used by the interference UE (that is, which is used to transmit the interference signal) among all PMI is burdensome. Accordingly, the PMI of the interference UE may be restricted to an extent that performance of the interference UE is not reduced.

A codebook subset may be restricted. For example, a specific UE may be enabled to use some of a total of 16 PMs for a report. In addition, such information may be delivered to the target UE such that the target UE blindly detects the TPMI with respect to the remaining PM(s) except for the PM, the use of which by the interference UE is restricted, (that is, the set of PMs which may be used by the interference UE) to cancel the interference signal.

That is, by providing codebook subset restriction information, the target UE is informed of the candidates of the TPMIs used by the interference UE. Accordingly, the rank of the interference UE may be restricted and, separately, rank restriction information of the interference UE (or the interference signal) may be explicitly provided. The rank restriction information, the PDSCH starting symbol index, the modulation order (or the MCS level) restriction information and HetNet support are equal to those of the DM-RS based signal of 2-1.

Additionally, even when the interference signal is a CRS based PDSCH, transmission mode (TM) information of the dominant interference UE may also be delivered for the purpose of indicating the PDSCH transmission method.

Next, information which may be signaled to the target UE when the interference signal is a CRS based signal will be described.

TABLE 8

| | | | CRS information | | | | | |
|---|---|---|---|---|---|---|---|---|
| Bit value | TM (Transmission Mode) of interfering UE | PCID (Physical Cell ID) | CRS information (CRSPortsNumber, FrequencyShift, MBSFNsubframe pattern) | CRS to PDSCH power ratio | TPMI or codebook subset restriction | Rank Restriction | PDSCH starting Symbol index | Modulation order restriction |
| 0 | TM2 | PCID (0) | _PortNum0, _Freqshift0, _MBSFN _subframe _0 | $\rho_A(0)$, $\rho_B(0)$, | | | 2 | — |
| 1 | TM3 | PCID (1) | _PortNum1, _Freqshift1, _MBSFN _subframe _1 | $\rho_A(1)$, $\rho_B(1)$, | 01 | 1 | 1 | 2 |
| 2 | TM4 | PCID (2) | _PortNum1, _Freqshift1, _MBSFN _subframe _1 | $\rho_A(2)$, $\rho_B(2)$, | 0000 ... 1111 | 2 | 3 | 4 |
| ... | | | | | | | | |

2-2-1. CRS Sequence Detection Procedure

Even when the CRS based interference signal is cancelled, the UE should measure and monitor the CRS of a neighbor cell for a long term. As shown in Table 8 above, when detecting the CRS based interference signal, the UE, which has received the CRS-related information of a specific cell, may determine that the PDSCH using the CRS is received as interference only when the intensity of the received CRS based signal is equal to or greater than a predetermined level and perform channel estimation and cancellation of the interference signal using the received CRS based signal, the intensity of which is equal to or greater than the predetermined level, only.

2-2-2. Subband Size Alignment

When information aiding interference cancellation is received to cancel the interference signal, subband size alignment of the interference signal should be further considered. A frequency domain to which a desired signal is allocated and a frequency domain to which an interference signal is allocated need to be considered. Unless resource allocation information of the interference signal is directly indicated, granularity for interference cancellation of the target UE should be predetermined between eNBs and should be used for resource allocation of one UE.

In addition, when the CRS based PDSCH interference is cancelled, the TPMI of the interference signal should not be changed in the unit of the frequency domain in which the target UE cancels interference. Preferably, the subband size used for CQI report by the target UE and the size of the frequency domain in which interference cancellation will be performed should be the same. That is, the PMI is determined in subband units when the serving cell allocates resources to the target UE and the unit in which the PMI is equally maintained when the neighbor cell allocates resources to the interference UE should be determined to the subband. Accordingly, on the premise that the subband size of the target UE and the subband size of the interference UE are the same, the target UE may perform interference cancellation in the frequency domain allocated thereto. In this case, the subband size and resource allocation should be predetermined between eNBs.

Similarly, PRB grouping is possible as a unit in which the TPMI is equally maintained. Within PRB grouping, the TPMI of the interference UE and the TPMI of the target UE are equally maintained. Information indicating how many PRBs are grouped and used for this purpose is also predetermined between eNBs.

All or some of the information described in 2.1 and subsequent chapters thereof may be transmitted to the target UE.

2-3. Case in which DM-RS Based Signal and the CRS Based Signal are Mixed

Practically, in the interference signals of the target UE, the DM-RS based PDSCH and the CRS based PDSCH are mixed. In order to cancel the interference signal from the received signal, the target UE should determine whether the signal is a DM-RS based PDSCH or a CRS based PDSCH, estimate the amount of interference in the received signal based on the determination, and cancel interference from the received signal.

Accordingly, when the DM-RS based PDSCH and the CRS based PDSCH are mixed, information provided by the network and UE operation will be described. Table 9 below includes the information described in Tables 6 and 8 above and, for a description thereof, refer to Tables 6 and 8 above.

TABLE 9

| | | CRS information | | | | | DM-RS information | |
|---|---|---|---|---|---|---|---|---|
| Bit value | TM (Transmission Mode) of interfering UE | PCID (Physical Cell ID) | CRS information (CRSPortsNumber, FrequencyShift, MBSFN subframe pattern) | CRS to PDSCH power ratio | TPMI or codebook subset restriction | Rank Restriction | VCID (virtual cell ID) $\in\{0, 1, 2, \ldots, 503\}$ | nSCID $\in\{0, 1\}$ |
| 0 | TM 4 | PCID (0) | _PortNum0, _Freqshift0, _MBSFN_subframe_0 | $\rho_A(0)$, $\rho_B(0)$, | 0000 ... 1111 | 2 | — | — |
| 1 | TM 10 | | _PortNum1, _Freqshift1, _MBSFN_subframe_1 | $\rho_A(1)$, $\rho_B(1)$, | — | 4 | nVCID (1) | {0} |
| 2 | TM 10 | PCID (2) | _PortNum2, _Freqshift2, _MBSFN_subframe_2 | $\rho_A(2)$, $\rho_B(2)$, | | | nVCID (2) | {0} |
| ... | | | | | | | ... | ... |

TABLE 9-continued

| | | | Rate-matching information | | | | |
|---|---|---|---|---|---|---|---|
| | QCL assumption | | | | CRS information | | |
| Bit value | (non-zero power) CSI-RS index | PCID (Physical Cell ID) | NZP CSI-RS index | ZP CSI-RS index | (CRSPortsNumber, FrequencyShift, MBSFN subframe pattern) | PDSCH starting Symbol index | Modulation order restriction |
| 0 | — | nPCID (0) | — | — | PortNum0, Freqshift0, MBSFN_ subframe_ 0 | 2 | — |
| 1 | qcl-CSI-RS index(1) | | CSI-RS (1) | ZP CSI-RS (1) | PortNum1, Freqshift1, MBSFN_ subframe_ 1 | 1 | 2 |
| 2 | | nPCID (2) | | | PortNum2, Freqshift2, MBSFN_ subframe_ 2 | 3 | 4 |
| ... | ... | | | | ... | | |

In Table 9, information provided to the target UE when it is not determined which RS is used to modulate the interference signal is shown. First, the eNB signals information indicating whether the interference signal is a CRS based PDSCH or a DM-RS based PDSCH using a signaled TM. The transmission method of the interference signal may be identified according to the signaled TM.

In the CRS based TM (e.g., TM 4), the eNB provides CRS related information. At this time, DM-RS related information is not provided. That is, in the CRS based TM, QCL assumption is not necessary and thus may be omitted.

In the DM-RS based TM (e.g., TM 10), the eNB may provide DM-RS related information as well as CRS related information.

When the target UE receives the information shown in Table 9 and cancels the interference signal, since the CRS is always transmitted regardless of transmission of the PDSCH, the target UE assumes that the DM-RS based PDSCH is present using the given TM and blindly detects the DM-RS sequence. Thereafter, if it is determined that the DM-RS interference signal is not present or after the DM-RS based interference signal is cancelled, the CRS based interference signal is estimated.

Third Embodiment—Method for Interference Capabilities of UE to CSI Feedback

First, in case of single cell/multi-cell MU-MIMO shown in FIGS. 5(c) and 5(d), when the target UE may obtain information on the interference signal and cancel the interference signal, the capabilities of the UE is applied to a channel state information (CSI) report of the UE.

When the target UE may cancel the interference signal, since a reception SINR may be improved by interference cancelled by the UE and an optimal beam direction may be changed, the UE may receive and decode a target (desired) PDSCH with a higher modulation order and code rate and in a better beam direction as compared to the case in which interference is not cancelled/reduced. Accordingly, if the target UE has capabilities for cancelling the interference signal, the UE preferably reports CSI to which the capabilities are. The present invention proposes a method for applying interference signal cancellation capabilities to a CSI report when a UE has the interference signal cancellation capabilities. The CSI report relates to a channel state of the UE reported to the network and includes CQI, PMI, RI, etc. When the UE measures CSI, the UE measures a target channel and an interference channel transmitted thereto, determines reception CQI/PMI/RI, etc. based on the measured channels, and reports the reception CQI/PMI/RI, etc. to the network. A reference signal for measuring the target channel currently includes a CRS and a CSI-RS in a 3GPP LTE/LTE-A system and an evolved system. A reference signal for measuring the interference channel includes a CRS and channel state information-interference measurement (CSI-IM) resources.

That is, in CSI measurement, the target channel and the interference channel are measured using the CRS in TM 1 to 8. A UE set to TM 9 measures a target channel using a CSI-RS and measures an interference channel using a CRS. A UE set to TM 10 measures a target channel using a CSI-RS and measures an interference channel using CSI-IM.

In the present embodiment, the method for applying the interference cancellation capabilities of the UE receiver to the CSI report is proposed. That is, since residual interference may be reduced after the UE has canceled interference, the present embodiment relates to a method for performing CSI measurement in consideration of the amount of cancelled interference. Accordingly, a method for applying interference cancellation capabilities of a UE to CSI in interference measurement using a CRS and a method applying interference cancellation capabilities of a UE to CSI in interference measurement using CSI-IM resources are proposed.

The method of the present embodiment uses a method for performing channel estimation of an interference signal using an RS of the interference signal and cancelling the interference signal from an entire received signal. Accordingly, the UE should receive information on a set of dominant interference sources from a network and perform channel estimation of the interference signal using the received information. The information on the dominant interference sources, which is sent from the network to the UE, may include information on a seed of an RS sequence and TM, PDSCH starting symbol index, QCL information and rate matching information in case of DM-RS based interference, information on a TPMI, modulation order and rank in case of CRS based interference. The method for, at the UE, receiving such information and estimating and cancelling the interference signal in order to increase reception performance of the signal transmitted thereto was described in the embodiments of the present application above. Hereinafter, basic information for the UE to cancel interference, which is provided by the network (eNB), described in the embodiments of the present application above may be referred to as interference cancellation information.

The present embodiment does not relate to a method for cancelling interference in a subframe in which a PDSCH is scheduled to a UE but a method for applying interference cancellation capabilities of the UE in a subframe in which the UE measures CSI for CSI feedback. At this time, information provided by the network in order to enable the UE to cancel interference in the subframe in which the PDSCH is scheduled to the UE may be used for CSI measurement. That is, the RS of the interference UE is blindly detected using given information, channel estimation of the interference signal is performed using the RS of the interference UE, and the estimated interference channel is cancelled from the measured interference.

When the UE has interference cancellation capabilities, the network may instruct the UE to feed CSI, to which interference cancellation capabilities of the UE are applied, back or to feed CSI, to which interference cancellation capabilities of the UE are not applied, back. That is, even when the UE has interference cancellation capabilities, the UE may not cancel the interference signal in a PDSCH reception step due to several restrictions. Accordingly, in this case, when the UE feeds CSI back after dominant interference is cancelled, performance of the UE may deteriorate. Accordingly, the network instructs the UE to report CSI after interference cancellation or CSI before interference cancellation. Here, several restrictions include the case in which a timing advanced (TA) value of a specific UE is too large to estimate an interference signal upon receiving a PDSCH or the case in which a target PDSCH is transmitted using all layers supportable by the UE and thus demodulation and estimation of an interference signal cannot be performed.

As another embodiment, the network may instruct the UE to report CAS after interference cancellation and/or CAS before interference cancellation. When the two pieces of CSI is instructed to be reported, CSI feedback resources necessary for the CSI report are allocated to eNB.

3-1. Symbol-level Interference Cancellation

3-1-1. Method for Applying Interference Capabilities of UE to CSI Report in CRS Based Interference Measurement Except for TM 10 defined in an existing 3GPP LTE/LTE-A system, a UE set to TM 1 to 9 measures interference based on CSI for CSI feedback. When a received CRS based signal of a serving eNB is subtracted from an entire received signal received at location (Res) where the CRS of the serving eNB is transmitted using a known CRS sequence of the serving eNB, the amount of interference and noise at that location is obtained. As a result, the UE set to TM 1 to 8 may obtain a reception SINR value using the CRS of the serving eNB thereof and feed CSI back. The UE set to TM 9 measures a signal S thereof (a signal scheduled thereto) using the CSI-RS, measures I+N (interference and noise) using the CRS of the serving eNB, obtains a reception SINR, and feed CSI back.

For convenience of description, interference and noise except for the signal S thereof is referred to as I. Then, when the signal S is subtracted from the received signal using the CRS of the serving eNB, the following equation is obtained.

$$I_{total}[i,j]=R_{received}[i,j]-S_{target}[i,j],$$ [Equation 1]

where i, j are [symbol, RE] index on which serving cell CRS ports are mapped $R_{received}[i, j]$ is total signal power received at the location (RE) where the CRS is transmitted and $S_{target}[i, j]$ is CRS received signal power of the serving eNB at that location. $I_{total}[i, j]$ is the intensity of that obtained by subtracting the CRS received signal power of the serving eNB from the total received signal power. Applying interference cancellation capabilities of the target UE to CSI means that CSI is calculated using interference left by cancelling the dominant interference signal power from $I_{total}[i, j]$ and is fed back.

When the UE feeds the CSI back, the CSI is calculated by averaging Equation 1 within a time and frequency region determined according to CSI feedback configuration and is fed back. The number of subbands for CSI feedback of the UE is m, values obtained by averaging $I_{total}[i, j]$ and $S_{target}[i, j]$ within the time and frequency region (subband or whole band) are respectively $I_{total}[m]$ and $S_{target}[m]$ (where m is subband index), and $I_{report}[m]$ used for CSI calculation after cancellation of interference of a specific dominant interference source is as follows.

$$I_{report}[m]=I_{total}[m]-I_{cancelled}[m]$$ [Equation 2]

When the target UE calculates the CI, $S_{target}[m]/I_{total}[m]$ is not used but $$\frac{S_{target}[m]}{I_{report}[m]} = \frac{S_{target}[m]}{I_{total}[m] - I_{cancelled}[m]}$$

is used as a reception SINR value. Here, a value obtained by averaging $I_{total}[i, j]$ over the whole band in order to increase estimation performance may be used as $I_{total}[i, j]$. In this case, this may be expressed by $I_{total}$.

At this, time, signaling and method necessary when a dominant interference source is detected and channel estimation of the interference signal is performed is similar to the above-described method for, at the target UE, performing interference cancellation in order to improve PDSCH reception performance thereof. The dominant interference source may be semi-blindly detected using information on dominant interference source candidates. When the dominant interference source candidates are not separately signaled, the UE blindly detects the interference source within capabilities thereof. Then, the UE performs channel estimation of the interference signal using the detected RS, subtracts the interference signal from interference measured at the location (RE) where the CRS of the serving eNB is transmitted, and calculates and reports the CSI. Even when the dominant interference source is detected, it should be determined whether interference is CRS based interference or DM-RS based interference and estimation of the interference channel is performed using the detected RS.

If the transmission location of the CRS of the serving eNB and the transmission location of the CRS of a specific eNB overlap (colliding CRS) and the power of the received signal of the overlapped CRS is equal to or greater than a predetermined level, the UE subtracts CRS receive power of the serving eNB thereof from the entire received signal and determines a PDSCH transmitted by the eNB is present in a PDSCH region other than resources used for CRS transmission using the overlapped CRS received signal power value. At this time, the above-described signaling and interference cancellation method necessary when cancelling CRS based PDSCH interference is used.

If it is determined that the CRS based PDSCH is not transmitted, the UE subtracts the CRS receive power, that is, the receive power of the CRS of the specific eNB, from $I_{total}[m]$, and calculates and feeds the CSI back. If it is determined that the CRS based PDSCH is transmitted, the UE performs channel estimation of the interference PDSCH, subtracts power corresponding to the estimated value from $I_{total}[m]$ and calculates and feeds CSI back.

3-1-2. Method for Applying Interference Cancellation Capabilities of UE to CSI in CSI-IM Resource Based Interference Measurement CSI-IM resources are some of resources set to a zero power (ZP) CSI-RS and refer to resources for measuring interference.

More specifically, for an eNB and UE set to TM 10, the UE may receive one or more CSI-IM resource configuration(s). Two parameters may be configured via higher layer signaling for each CSI-IM resource configuration and include a zero power CSI RS configuration and zero power CSI RS subframe configuration. The UE does not anticipate reception of CSI-IM resource configuration(s) which does not completely overlap one power zero CSI-RS resource configuration of the UE. In addition, the UE does not anticipate reception of CSI-IM resource configuration which does not completely overlap one of power zero CSI-RS resource configurations. The UE must not anticipate CSI-IM resources and PMCH configurations in the same subframe of the serving eNB.

The power zero CSI RS resources will be described in greater detail. For an eNB and UE set to TM 1 to 9, the UE may receive one zero power CSI-RS resource configuration. For an eNB and UE set to TM 10, the UE may receive one or more zero power CSI-RS resource configuration(s). For one or more zero power CSI-RS resource configuration(s), the following parameters may be configured via higher layer signaling.

power zero CSI RS configuration list
power zero CSI RS subframe configuration

When a specific UE measures interference at a specific CSI-M resource location, the PDSCH scheduled to the UE may or may not be mapped to the CSI-IM. Hereinafter, assume that, when the UE measures interference using the CSI-RS resources, the PDSCH scheduled to the UE is not mapped to the resources. If the PDSCH of the UE is mapped to the resources, operation after subtracting the signal of the UE will be described.

Primarily, the network informs the UE of a plurality of CSI-IM resource configurations, performs rate matching of a PDSCH of a specific dominant interference source per CSI-IM resource and transmits the PDSCH, such that interference of the specific dominant interference source appears to be not present in the specific CSI-IM resources. Thus, the UE may report CSI. However, if the number of dominant interference sources is increased and the number of UEs for cancelling interference is increased, it becomes difficult for the network to manage the dominant interference sources and the UEs.

The UE measures interference of the CSI-IM resources, which is referred to as $I_{total}$. In order to determine from which eNB interference is received or how much interference is received, the UE semi-blindly detects an RS sequence using information on dominant interference sources received via a higher layer signal and performs channel estimation of the interference signal using the detected RS. A value obtained by subtracting a channel value of the estimated interference signal from $I_{total}$ is used for CSI feedback. That is, if the channel value of the interference signal subtracted by estimation of the UE is $I_{cancelled}$, interference used by the UE for CSI report becomes $I_{report}=I_{total}-I_{cancelled}$. That is, since interference is reduced, higher CQI may be reported.

When the UE performs channel estimation of the interference signal using the RS information transmitted by eNBs which may cause interference, the UE should determine whether interference is CRS based interference or DM-RS interference.

When the UE detects the interference signal on the assumption of DM-RS based interference, if PRB bundling information of a specific DM-RS is present and may be assumed, a DM-RS sequence is detected in PRB bundling units. If a specific DM-RS sequence is detected, the UE may cancel the estimated channel value of the bundled PRB from total interference, based on interference measured via the CSI-IM resources in the bundled PRB. In this case, a unit for cancelling interference by the UE becomes a PRB bundling unit. A unit for measuring and cancelling an interference signal by the UE becomes a PRB bundling unit and an average of CSI-RS resources distributed over an entire band may be used as interference measured via CSI-IM resources.

$$I_{report}[k]=I_{total}-I_{cancelled}[k] \quad \text{[Equation 3]}$$

where, k 1, 2, ..., N and N denotes a total number of bundled PRBs.

The PRB bundling unit means granularity for, at an eNB, allocating a PDSCH to a UE and precoding and DM-RS sequence used within the bundled PRB are the same. This means that such information is exchanged between eNBs to allocate the PDSCH using a PRB bundling size and frequency axis and that interference signals introduced into the bundled PRBs completely overlap. Thus, interference cancellation using the DM-RS sequence is possible.

When the interference signal is detected on the assumption of CRS based interference, information on a subband size is necessary similarly to a DM-RS. The TPMI of the interference signal is changed according t PRB subband size unit and an assumption that the TPMI of the interference is not changed within the subband is necessary. The CRS sequence is detected using given CRS sequence information and channel estimation is performed using the detected CRS. Whether the PDSCH transmitted based on the CRS is present in the PDSCH region is determined using the estimated channel value and the CRS-to-PDSCH energy per resource element (EPRE) value of the CRS. If it is determined that the CRS based PDSCH is present, a value obtained by subtracting the estimated channel value from the total interference is used for CSI feedback.

$$I_{report}[m]=I_{total}-I_{cancelled}[m] \quad \text{[Equation 4]}$$

where, m=1, 2, ..., L and L denotes a total number of subbands.

In this case, a unit for, at a UE, detecting and estimating an interference signal and a unit for cancelling interference becomes a subband size unit. An average of CSI-RS resources distributed over an entire band may be used as interference measured via CSI-IM resources.

When interference is measured using CSI-IM resources, the network should inform the UE whether a PDSCH corresponding to a specific RS sequence is transmitted via specific CSI-IM resources. That is, a PDSCH corresponding to a specific RS sequence (or a PDSCH of a specific eNB) may be muted and transmitted via CSI-IM resources due to CoMP scheme and the PDSCH corresponding to the specific RS sequence (or the PDSCH of the specific eNB) may be transmitted in a PDSCH region other than the CSI-IM resources. If separate signaling is not performed, the UE recognizes interference measured using the CSI-IM resources as $I_{total[\cdot]}$, recognizes a value obtained by channel estimation of the interference signal as the amount of interference to be cancelled, and subtracts the value from $I_{total[\cdot]}$, thereby increasing inaccuracy of CSI feedback. In this case, since interference due to the PDSCH corresponding to the specific RS sequence (or the PDSCH of the specific eNB) is not present in the CSI-IM resources, even when the PDSCH corresponding to the specific RS sequence (or the PDSCH of the specific eNB) is detected from the PDSCH as a dominant interference source, the PDSCH corresponding to the specific RS sequence (or the PDSCH of the specific eNB) is not subtracted from $I_{total[\cdot]}$. Accordingly, the network informs the UE whether the PDSCH corresponding to the specific RS sequence (or the PDSCH of the specific eNB) is muted in the specific CSI-IM resources.

When the network informs the UE whether the PDSCH corresponding to the specific RS sequence (or the PDSCH of the specific eNB) is muted in the specific CSI-IM resources, if the eNB configures an environment in which properties of interference with the UE are different, for example, if an ABS is used, the eNB may configure a plurality of subframe subsets having different interference properties. In this case, the network should the UE whether the PDSCH corresponding to the specific RS sequence (or the PDSCH of the specific eNB) is muted in the specific CSI-IM resources per subframe subset.

When the UE measures interference and performs estimation of the interference signal, since DM-RS based interference and CRS based interference may be mixed, a unit for maintaining identity of DM-RS based interference and a unit for maintaining identity of CRS based interference are differentiated to perform interference cancellation and CSI feedback thereon is not performed. Accordingly, preferably, a PRB bundling size and subband size for interference measurement and cancellation should be equally aligned. This means that the DM-RS sequence in the bundled PRBs is not changed and thus the property of the interference channel is equally maintained in the bundled PRB. Similarly, since the TPMI in the same subband is not changed, the property of the interference channel in the subband is equally maintained. Accordingly, in a general communication environment in which it is not determined whether an interference signal is a DM-RS based PDSCH or a CRS based PDSCH, the interference channel property is equally maintained within a predetermined frequency unit to enable a high-performance UE to perform interference cancellation. In this case, PRB bundling sizes and subband sizes of neighbor eNBs should be equally aligned and information thereon should exchanged between eNBs. Information indicating that the two sizes are the same should be signaled to the UE. The target UE performs interference cancellation of an interference signal on the assumption that the PRB bundling size and subband size thereof are equal to those of the interference signal. As another embodiment, in addition to the PRB bundling size and subband size, PRB grouping may be defined for interference cancellation. Accordingly, the UE may be informed that the interference signal channel is equally maintained in PRB grouping units. In addition, the target UE performs channel estimation and cancellation of the interference in PRB grouping units.

3-2. Codeword-level Interference Cancellation

The method for calculating and feeding the CSI back in consideration of IC capabilities of the UE in the CSI feedback step was described above and the method for demodulating the interference signal and then performing channel estimation of the interference signal when performing IC in consideration of symbol-level IC (that is, demodulation and IC) was described above. Hereinafter, a method for applying IC capabilities of a UE to CSI feedback in consideration of codeword-level ID will be described. Codeword-level IC (that is, decoding and IC) means that an interference signal is decoded and is regenerated and then IC is performed. Accordingly, in this case, the UE should sufficiently decode the interference signal in order to perform IC. That is, the MCS of the interference signal is always set to be lower than the reception SINR of the interference signal link. In other words, when the interference signal is transmitted in a state in which the reception SINR of the interference signal is very low and the modulation order and code rate of the signal is very high, the UE does not decode the interference signal and thus, cannot perform IC. Accordingly, if it is determined that IC of a specific interference signal may be performed to feed CSI back but the interference signal is transmitted with a MCS significantly higher than a received signal level of the interference signal upon receiving the PDSCH, the UE may not perform IC, thereby leading to target PDSCH reception performance deterioration. Accordingly, a method for preventing such a phenomenon will now be described.

Fundamentally, in the decoding and IC method, information and operation necessary for the demodulation and IC method is included and additional information and operation is necessary. In particular, CSI measurement and feedback of a neighbor eNB acting as a dominant interference source is necessary to decode the interference signal. Accordingly, the serving eNB informs the UE of RS information of the eNB, which should be measured by the UE in order to perform IC. That is, the serving eNB informs the UE of a plurality of RSs for CSI measurement. At this time, when interference measurement is performed using CSI-IM resources, the UE is explicitly informed of a relationship between a specific CSI-RS and CSI-IM. Since the UE measures a plurality of RSs and feeds CSI back, the UE needs to be explicitly informed of CSI feedback resources corresponding to the specific RS and a relationship therebetween. Accordingly, the concept of the CSI process defined in 3GPP Rel-11 is extended and defined. The CSI process refers to mapping an RS for S (the signal of the UE)-measurement and resources for I (interference)-measurement when the UE performs CSI measurement. The CSI process according to the present embodiment includes the following three types:
1) CSI process=CSI-RS+CSI-IM
2) CSI process=CSI-RS+CRS
3) CSI process=CRS In the CSI process defined by 1), a specific CSI-RS and specific CSI-IM are connected and S-measurement and I-measurement are performed using the CSI-RS and CSI-IM. In the CSI process defined by 2), a specific CSI-RS is used for S-measurement and a specific CRS is used for I-measurement. In the CSI process defined by 3), S-measurement and I-measurement are performed using the CRS. The eNB informs the UE of a plurality of CSI-RSs and a plurality of CSI-IM configurations and indices thereof are mapped to the CSI processes. For the CRS, a plurality of cell IDs and the number of CRS ports, frequency shift, multicast broadcast single frequency network (MBSFN) configuration, etc. are indicated and the cell IDs and indices corresponding thereto are mapped to CSI processes.

A plurality of CSI processes is configured with respect to the UE and CSI feedback resources therefor are allocated to instruct CSI feedback. A plurality of different CSI processes defined by 1), 2) and 3) may be configured with respect to the UE. Alternatively, when a plurality of CSI processes is configured with respect to the UE, each CSI process may be composed of a CSI process defined by one of 1), 2) or 3) only.

When a plurality of CSI processes is configured with respect to the UE for CSI feedback, the UE should be explicitly informed which of the plurality of CSI processes is used for a serving eNB. Unless explicitly indicated, the eNB and the UE may predetermine that a CSI process having a lowest index or a specific index among the plurality of CSI processes is used for the serving eNB. The reason why the UE is informed which of the plurality of CSI processes is used for a serving eNB is because the eNB may instruct that CSI feedback for the serving eNB is performed after interference is cancelled. The UE may feed CSI after interference cancellation back with respect to some CSI processes instructed by the eNB among the plurality of CSI processes and feed CSI before interference cancellation back with respect to the remaining CSI processes.

In addition, when a plurality of CSI processes is configured, the eNB needs to inform the UE whether the plurality of CSI processes is configured for CoMP operation or for CSI feedback after IC due to IC capabilities of the UE receiver.

A specific CSI process among the plurality of CSI processes is for CSI measurement/feedback of an interference eNB. When the UE feeds CSI after IC back to the serving eNB thereof, CSI information of the interference eNB should be delivered to the interference eNB. Although the UE directly feed the CSI information of the interference eNB back to the interference eNB, coordination between the interference eNB and the serving eNB is necessary with respect to UL feedback resources/period and thus complexity may be high. Preferably, the UE should feed CSI back to the serving eNB thereof with respect to the plurality of CSI processes and the serving eNB should deliver CSI feedback information of a specific interference eNB and, more particularly, MCS to the interference eNB. This is an indicator indicating the quality of an interference signal link, which serves to inform the interference eNB of a MCS value used when the UE decodes the interference signal to perform IC. The interference eNB, which has received such information, may aid the UE of the neighbor eNB in easily performing IC with respect to the signal thereof. That is, the interference eNB may schedule a serving UE thereof with MCS restriction. In this case, the interference eNB informs the neighbor eNB whether MCS restriction is applied when scheduling the serving UE thereof and informs the neighbor eNB of a maximum MCS value to be used by the eNB if restriction is applied.

More specifically, when two CSI processes are configured with respect to the UE, CSI process 1 is for CSI feedback of the serving eNB and CSI process 2 is for CSI feedback of the interference eNB. The case in which CSI after IC is fed back when UE performs CSI feedback for CSI process 1 will be described. In this case, assume that a CQI value for CSI process 1, that is, a MCS level, is $MCS_1$ and a CQI value for CSI process 2, that is, a MCS level, is $MCS_2$. A maximum MCS value when the interference eNB corresponding to CSI process 2 applies MCS restriction upon scheduling the UE is $MCS_{upper}$. When the serving eNB schedules a serving UE thereof, scheduling is not performed with MCS reported by the UE but the MCS level $MCS_2$ for CSI process 2 and $MCS_{upper}$ are compared. If $MCS_2 \geq MCS_{upper}$, the serving eNB schedules the UE using $MCS_1$ reported by the UE with respect to CSI process 1. In contrast, if $MCS_2 < MCS_{upper}$, the serving eNB applies a predetermined offset to $MCS_1$ reported by the UE with respect to CSI process 1 to schedule the UE with a low MCS value or increases an energy per resource element (EPRE) value when transmitting a PDSCH to the UE. The offset value applied when the serving eNB schedules the UE thereof may be changed according to the $MCS_{upper}$ value. That is, the offset of the MCS applied by the serving eNB is determined by a function ($MCS_{upper}$-$MCS_2$). Alternatively, when the serving eNB schedules the UE thereof using $MCS_1$, a boosted transmit power value may be changed according to the $MCS_{upper}$ value. Similarly, an EPRE increment increased by the serving eNB is determined by a function of ($MCS_{upper}$-$MCS_2$).

If dynamic coordination between eNBs is possible, by more efficiently utilizing IC capabilities of the UE while considering reception quality of an interference signal link, it is possible to improve performance. If the MCS when the interference eNB corresponding to CSI process 2 schedules the serving UE thereof at a specific time is $MCS_{2\_scheduled}$, although the interference eNB informs the serving eNB of $MCS_{upper}$, since $MCS_{2\_scheduled} \leq MCS_{upper}$, if dynamic information exchange between eNB is possible, $MCS_{2\_scheduled} < MCS_{upper}$ may be maximally used. That is, if $MCS_2$ reported by the UE<$MCS_{upper}$ and $MCS_{2\_scheduled} \leq MCS_2 < MCS_{upper}$, the serving eNB compares interference link quality $MCS_2$ corresponding to CSI process 2 measured and reported by the serving UE with $MCS_{2\_scheduled}$ used by the interference eNB for actual scheduling in a specific subframe. That is, if $MCS_{2\_scheduled} \leq MCS_2 < MCS_{upper}$, the serving eNB regards that the serving UE may cancel interference of the interference link signal and schedules the UE with $MCS_1$. This enables the UE to perform IC. However, if $MCS_2 \leq MCS_{2\_scheduled} < MCS_{upper}$, when the serving eNB schedules the serving UE, a predetermined offset is applied to $MCS_1$ reported by the UE to schedule the UE with a low MCS level. That is, the offset of the MCS applied by the serving eNB is determined by a function ($MCS_{2\_scheduled}$-$MCS_2$). Alternatively, when the serving eNB schedules the serving UE with $MCS_1$, the EPRE of the PDSCH of the serving UE is increased. Similarly, an EPRE increment increased by the serving eNB is determined by a function ($MCS_{2\_scheduled}$-$MCS_2$). For such operation, coordination between neighbor eNBs for MCS is necessary and such information delivery should be dynamic. $MCS_{2\_scheduled}$ information may be received from the neighbor eNB per subframe or $MCS_{2\_scheduled}$ for a certain future subframe is predetermined to exchange information with a predetermined pattern.

When the UE feeds CSI of an interference eNB back and coordination between eNBs for MCS is performed in order to increase performance and efficiency of decoding and IC, a probability that a maximum MCS level is not used when the eNB schedules a signal thereof is very high. Accordingly, for entire system performance and a UE located at the center of coverage of an eNB, resources for applying MCS restriction may be separately managed.

As an embodiment for applying MCS restriction to resources, information on a subframe to which MCS restriction is applied may be exchanged between eNBs in advance. With respect to a plurality of future subframes, a maximum value of the MCS to be scheduled is exchanged between eNBs. A MCS map of a plurality of subframes (a sequence of MCSs of each subframe) is delivered. That is, in a plurality of future subframes, an upper limit value of the MCS to be used by each eNB is exchanged between eNBs in advance. In the above-described embodiment, if the MCS map delivered from the interference eNB corresponding to CSI process 2 to the serving eNB is $\{MCS_{upper[j]}$, where, j denotes a relative or absolute subframe number index$\}$, when the serving eNB schedules the serving UE thereof, $MCS_2$ and $MCS_{upper[\cdot]}$ at that time are compared to determine whether an offset is applied to $MCS_1$ and schedules the UE.

When each eNB delivers information with MCS restriction in the time domain, a plurality of subframe subsets may be configured to signal an upper limit value of the MCS to be used by the eNB per subframe subset. For example, if each eNB informs the neighbor eNB of subframe subset 0 with MCS restriction and subframe subset 1 without MCS restriction, an example of information to be exchanged between eNB is as follows.

Information on subframe subset 0 and subframe subset 1 and a maximum MCS level at each subframe subset should be signaled. Each subframe subset may be expressed by a bitmap, each bit refers to one subframe, a value of 1 indicates that MCS restriction is applied and a value of 0 indicates that MCS restriction is not applied (and vice versa).

In addition, $MCS_{upper[\cdot]}$ is signaled per subframe to indicate a restricted MCS value per subframe. However, $MCS_{upper}$, is preferably indicated per subframe and a simple method indicating this may be indicated with a modulation order such as QPSK, 16 QAM and 64 QAM. In this case, $MCS_{upper}$ has a value of $\{2, 4, 6, 7, 8\}$, which indicate QPSK, 16 QAM, 64 QAM, 128 QAM and 256 QAM, respectively.

In this case, the following signaling method may be used. That is, a subframe denoted by 1 indicates that MCS restriction is applied and a subframe denoted by 0 indicates that MCS restriction is not applied. If restriction is applied, a maximum modulation order is 4, which indicates 16 QAM.

MCS subframe pattern: $\{1001110010100101010 \ldots \}$, $MCS_{upper}=4$

As another method, two MCS subframe subsets may be signaled, one subframe subset indicates a subframe with MCS restriction and another subframe indicates a subframe without MCS restriction. Each bit of each subframe subset indicates one subframe and each bit value indicates whether the subframe belongs to a subframe subset. That is, in MCS subframe subset 0, a subframe denoted by 1 indicates that the subframe belongs to MCS subframe subset 0, that is, a subframe with MCS restriction, and a subframe denoted by 0 indicates that the subframe does not belong to MCS subframe subset 0. In MCS subframe subset 1, a subframe denoted by 1 indicates that the subframe belongs to MCS subframe subset 1 and a subframe denoted by 0 indicates that the subframe does not belong to MCS subframe subset 1. The restricted MCS level may be indicated per MCS subframe subset. In the following embodiment, a maximum modulation order is 4, that is, 16 QAM, in MCS subframe subset 0 and is 6, which indicates that all currently defined maximum modulation orders are supported, in MCS subframe subset 1. In MCS subframe subset 1, information on $MCS_{upper}$ may be omitted. At this time, $MCS_{upper}=MCS_{max}$.

MCS subframe subset 0: $\{1001110010100101010 \ldots \}$, $MCS_{upper}=4$

MCS subframe subset 1: $\{0110001101011010101 \ldots \}$, $MCS_{upper}=6$

Although the modulation order was described when $MCS_{upper}$ is signaled per subframe subset, more accurately, the modulation order and code rate should be indicated. The indices defined in Table 7 above may be used. In Table 7, the MCS index $I_{MCS}$ indicates a modulation order and a transport block size (TBS) index. The modulation order has a value of $\{2, 4, 6, 7, 8\}$, which respectively indicate QPSK, 16 QAM, 64 QAM, 128 QAM and 256 QAM, as described above, The TBS index is an indirect code rate indicator and the code rate is determined according to PDSCH RB allocation and the number of layers. Accordingly, in the present invention, when MCS restriction information is provided, for example, the MCS is restricted to a specific value or less, e.g., $I_{MCS} \leq 10$. In this case, $MCS_{upper}=I_{MCS\_upper}$. In the above-described embodiment, if MCS restriction is applied, MCS restriction information such as $MCS_{upper}=(I_{MCS\_}=)$ 10 may be signaled. In addition, by providing MCS restriction information such as $10 \leq I_{MCS} \leq 16$, the modulation order and code rate may be restricted. Information exchanged between eNB is shown in the following table.

TABLE 10

| IE/Group Name | Presence | Range | IE type and reference | Semantics description |
|---|---|---|---|---|
| CHOICE MCS Information | M | — | — | — |
| >FDD | | | — | — |
| >>MCS subframe pattern | M | | BIT STRING (SIZE(40)) | Each position in the bitmap represents a DL subframe, for which value "1" indicates the eNB warrants MCS level is limited upto 'MCS_upper' and value "0" indicates the corresponding subframe does not have any limitation on the MCS level. The first position of the MCS subframe pattern corresponds to subframe 0 in a radio frame where SFN = 0. The MCS subframe pattern is continuously repeated in all radio frames. The maximum number of subframes is 40. |

TABLE 10-continued

| IE/Group Name | Presence | Range | IE type and reference | Semantics description |
|---|---|---|---|---|
| >>MCS_upper | M | | ENUMERATED (1, 2, 3, ...) | $I_{MCS}$I (MCS Index) defined in TS36.213. Indicates upper limit of MCS on which a DL subframe with value "1" of the MCS subframe pattern. The value is used to inform other eNB that the source eNB warrants limited MCS in a subset of subframe on which the value "1" in MCS subframe pattern. |
| >TDD | | | — | — |
| >>ABS Pattern Info | M | | BIT STRING (1 ... 70, ...) | Each position in the bitmap represents a DL subframe, for which value "1" indicates the eNB warrants MCS level is limited upto 'MCS_upper' and value "0" indicates the corresponding subframe does not have any limitation on the MCS level. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211. The first position of the MCS subframe pattern corresponds to subframe 0 in a radio frame where SFN = 0. The MCS subframe pattern is continuously repeated in all radio frames. The maximum number of subframes is 40. |
| >>MCS_upper | M | | ENUMERATED (1, 2, 3, ...) | $I_{MCS}$I (MCS Index) defined in TS36.213. Indicates upper limit of MCS on which a DL subframe with value "1" of the MCS subframe pattern. The value is used to inform other eNB that the source eNB warrants limited MCS in a subset of subframe on which the value "1" in MCS subframe pattern. |

As another embodiment for applying MCS restriction to resources, MCS restriction may be applied to a specific frequency band and information thereon may be exchanged between eNBs. Preferably, when CSI is calculated and CS after IC is reported, if granularity for IC is defined as a specific grouped PRB, information as to whether a specific eNB applies MCS restriction per the grouped PRB or information on a maximum MCS level (information indicating that scheduling is performed with a maximum MCS level or less) if MCS restriction is applied may be exchanged between eNBs. As a result, a map indicating information on an upper limit value of MCS used by each eNB per grouped PRB is exchanged between eNBs.

When the UE considers only the reception SINR of the channel thereof, if a MCS value maximally supportable by the system is $MCS_{max}$, a maximum MCS level to be used by the eNB per grouped PRB is $MCS_{upper[j]}$ (where, j is an index of a grouped PRB) and $MCS_{upper[j]}=MCS_{max}$ in a specific grouped PRB, the eNB may instruct the UE to perform CSI feedback in the frequency band without performing IC. That is, since the interference eNB corresponding to CSI process 2 does not apply MCS restriction in a specific frequency band, the eNB may instruct the UE to perform CSI feedback for CSI process 1 before IC. In contrast, when performing CSI feedback for the grouped PRB with $MCS_{upper[j]}<MCS_{max}$, the eNB may instruct the UE to perform CSI feedback after IC. In this case, the subband size for CSI feedback of the UE and the grouped PRB size should be aligned between eNBs. If the eNB instructs the UE to perform CSI feedback after IC when performing CSI feedback for CSI process 1 regardless of $MCS_{upper[j]}$, the offset value applied to $MCS_1$ when the serving eNB schedules the UE may be changed according to $MCS_{upper[j]}$ per grouped PRB.

When the UE having IC capabilities calculates and reports CSI and, more particularly, CQI, the CQI value reported by the UE should satisfy a target frame error rate (FER) of 10% or less in reception of the PDSCH by the UE. Whether a UE receiver satisfies a target FER of 10% or less is tested and only terminals which pass through the test may be released. At this time, the UE may calculate CQI on a specific assumption. That is, the UE measures the signal of the interference eNB on the assumption that the signal is transmitted at a specific MCS level or with a specific modulation order only to consider the MCS or modulation order assumed by the UE, the UE calculates the amount of interference to be subtracted, applies the amount of interference to CQI and reports the CQI. That is, upon a report for CSI process 1, on the assumption that the interference eNB uses a fixed MCS or modulation order with respect to CSI process 2, CSI for CSI process 2 is calculated, whether decoding of the PDSCH transmitted by the interference eNB is successful with respect to CSI process 2 is determined, and CSI for CSI process 1 after IC is calculated and reported. Then, when the PDSCH is scheduled using the CSI for a predetermined time, whether the PDSCH reception FER of the serving eNB satisfies 10% or less. The MCS or modulation order of the neighbor eNB assumed by the UE may be received from the serving eNB or may be assumed by the UE to be reported to the serving eNB. This information may be different from information provided by the network (if present) for demodulation. That is, this information is used to calculate CQI.

Figure 6:
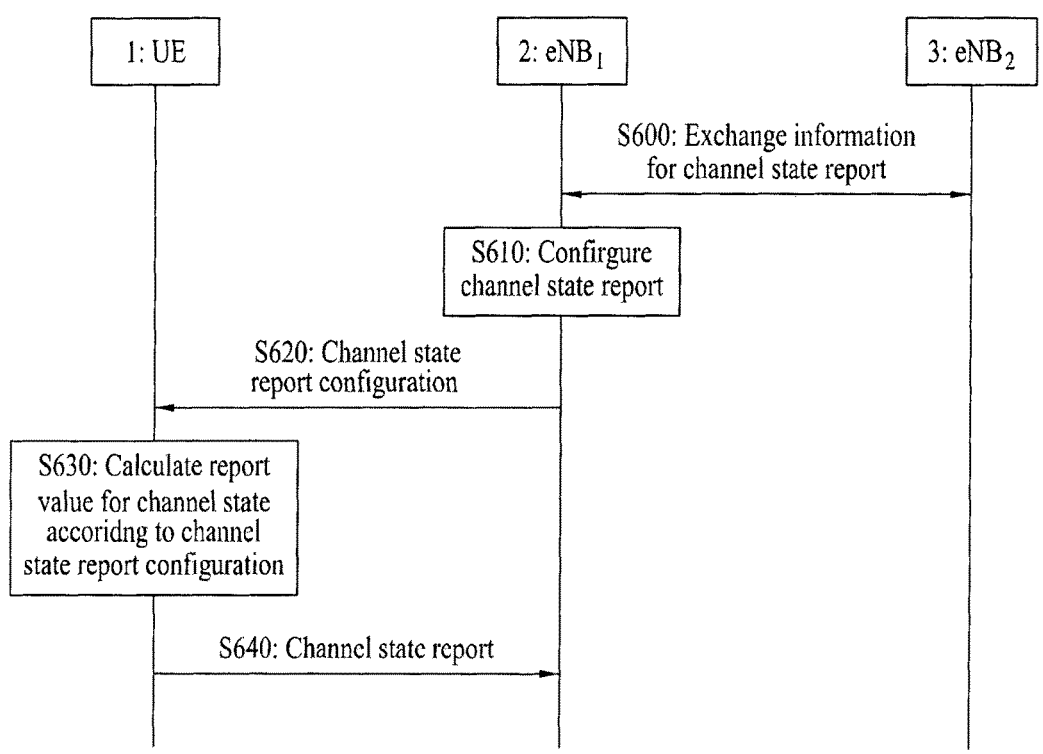
FIG. 6 is a diagram showing operation according to one embodiment of the present invention.

FIG. 6 shows operation according to one embodiment of the present invention.

A UE 1 includes interference cancellation capabilities and may include symbol-level IC capabilities or codeword-level IC capabilities. An $eNB_1$ 2 serves the UE 1 and coordinates with an $eNB_2$ 3 to improve interference cancellation of the UE 1.

The eNB₁ 2 and the eNB₂ 3 may exchange information for a channel state report (S600). The exchanged information is information for interference cancellation of the UE 1 and, more specifically, restrictions applicable when the eNB₂ 3 schedules a serving UE thereof in order to improve interference cancellation capabilities of the UE 1 or information related thereto. In the above-described embodiments, for example, MCS level restriction will be described.

The eNB₁ 2, which has received the restrictions or the information related thereto from the eNB₂ 3, may configure a channel state report for the UE 1 (S610). As described above, the channel state report configuration relates to whether interference cancellation capabilities of the UE 1 is applied to the channel state report, in consideration of the case in which interference cancellation is not necessary according to a scheduling state or condition of the UE 1 or the case in which interference cancellation is not preferable because a probability of deteriorating performance of the UE 1 is high. In addition, the channel state report configuration may be determined according to the information exchanged in step S600. For example, if the MCS level used by the eNB₂ 3 for the serving UE thereof is restricted, the channel state report configuration may indicate that the channel state report, to which interference cancellation is applied, is transmitted to the UE 1.

The eNB₁ 2 may transmit the channel state report configuration to the UE 1 (S620). The UE 1 may calculate report values for the channel state according to the channel state report configuration (S630) and report the report values to the eNB₁ 2 (S640).

Although the embodiments of the present invention are briefly described with reference to FIG. 6, the embodiment related to FIG. 6 may alternatively or additionally include at least some of the above-described embodiment(s).

Figure 7:
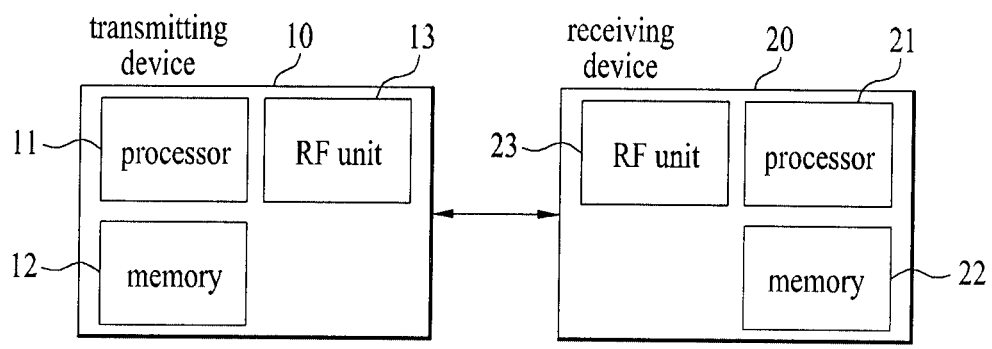
FIG. 7 is a block diagram of an apparatus for implementing embodiment(s) of the present invention.

FIG. 7 is a block diagram showing components of a transmitting device 10 and a receiving device 20 for performing the embodiments of the present invention. The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), Digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operate as the transmitting device 10 in uplink and operates as the receiving device 20 in downlink. In the embodiments of the present invention, an eNB operates as the receiving device 20 in uplink and operates as the transmitting device 10 in downlink.

The transmitter and/or the receiver may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

What is claimed is:

1. A method for interference cancellation for a user equipment (UE) having interference cancellation capability in a wireless communication system, the method comprising:
receiving, by the UE from a serving cell, interference cancellation information specific to a neighbor cell;
performing, by the UE, cancellation of interference signal transmitted from the neighbor cell according to the received interference cancellation information,
wherein the received interference cancellation information specific to the neighbor cell includes a number of physical resource blocks (PRBs) in a PRB group to which a same precoding is applied by the neighbor cell, the number indicating both a resource allocation granularity and a precoding granularity of the neighbor cell;
receiving, by the UE from the serving cell, modulation and coding scheme (MCS) level-restriction information for PRB groups to be used for the neighbor cell and channel state report configuration information about whether to report channel state information to which the interference cancellation is applied or not according to the MCS level-restriction information; and
reporting, by the UE in accordance with the channel state report configuration information, channel state information of a first PRB group to which the interference cancellation is not applied when a MCS level for the first PRB group is not restricted for the neighbor cell, and reporting, by the UE, channel state information of a second PRB group to which the interference cancellation is applied when a MCS level for the second PRB group is restricted for the neighbor cell.

2. The method according to claim 1, wherein the interference signal has a fixed channel characteristic within the number of PRBs corresponding to the number of PRBs in the PRB group.

3. The method according to claim 1, wherein the channel state report configuration information is configured per subframe subset.

4. The method according to claim 1, further comprising, when the interference signal is based on a cell-specific reference signal (CRS) and resources for transmitting a CRS of the serving cell overlap resources for transmitting CRS of a specific neighbor cell corresponding to an interference source in a subframe, determining, by the UE, whether interference exists in resources other than the overlapped resources in the subframe using received power of the CRS of the specific cell.

5. The method according to claim 1, further comprising, when the cancellation of the interference signal is based on channel state information-interference measurement (CSI-IM), receiving, by the UE from the serving cell, information as to whether a specific reference signal (RS) sequence-based data channel is transmitted in specific CSI-IM resources,
wherein the information as to whether the specific reference signal (RS) sequence-based data channel is transmitted in the specific CSI-IM resources is provided per subframe subset.

6. The method according to claim 1, further comprising receiving, by the UE from the serving cell, a plurality of channel state measurement resource configurations for channel state information measurement and a report for the serving cell and at least one neighbor cell.

7. The method according to claim 6, further comprising receiving, by the UE, information as to which of the plurality of channel state measurement resource configurations is for the serving cell.

8. The method according to claim 6, further comprising receiving, by the UE from the serving cell, information on purposes of the plurality of channels state measurement resource configurations.

9. A user equipment (UE) having interference cancellation capabilities and configured to report channel state information in a wireless communication system, the UE comprising:
a radio frequency (RF) unit including a transceiver; and
a processor that controls the RF unit,
wherein the processor:
receives, from a serving cell, interference cancellation information specific to a neighbor cell,
performs cancellation of interference signal transmitted from the neighbor cell according to the received interference cancellation information,
wherein the received interference cancellation information specific to the neighbor cell includes a number of physical resource blocks (PRBs) in a PRB group to which a same precoding is applied by the neighbor cell, the number indicating both a resource allocation granularity and a precoding granularity of the neighbor cell,
receives modulation and coding scheme (MCS) level-restriction information for PRB groups to be used for the neighbor cell and channel state report configuration information about whether to report channel state information to which the interference cancellation is applied or not according to the MCS level-restriction information, and
reports, in accordance with the channel state report configuration information, channel state information of a first PRB group to which the interference cancellation is not applied when the MCS level for the first PRB group is not restricted for the neighbor cell, and reports channel state information of a second PRB group to which the interference cancellation is applied when the MCS level for the second PRB group is restricted for the neighbor cell.

* * * * *